US012687760B2

(12) United States Patent　　　(10) Patent No.:　US 12,687,760 B2
Peccianti et al.　　　　　　　　　　(45) Date of Patent:　　Jul. 21, 2026

(54) METHOD OF GENERATING TERAHERTZ EMISSION USING AN INK

(71) Applicant: THE UNIVERSITY OF SUSSEX, Sussex (GB)

(72) Inventors: Marco Peccianti, Sussex (GB); Alan Dalton, Sussex (GB); Sean Ogilvie, Sussex (GB); Alessia Pasquazi, Sussex (GB); Juan Sebastian Totero Gongora, Sussex (GB); Antonio Cutrona, Sussex (GB); Luke Peters, Sussex (GB); Jacob Tunesi, Sussex (GB); Vittorio Cecconi, Sussex (GB)

(73) Assignee: THE UNIVERSITY OF SUSSEX, Sussex (GB)

( * ) Notice: Subject to any disclaimer, the term of this patent is extended or adjusted under 35 U.S.C. 154(b) by 263 days.

(21) Appl. No.: 18/279,646

(22) PCT Filed: Feb. 28, 2022

(86) PCT No.: PCT/GB2022/050534
§ 371 (c)(1),
(2) Date: Aug. 31, 2023

(87) PCT Pub. No.: WO2022/185040
PCT Pub. Date: Sep. 9, 2022

(65) Prior Publication Data
US 2024/0166907 A1　　May 23, 2024

(30) Foreign Application Priority Data
Mar. 1, 2021　(GB) ..................................... 2102874

(51) Int. Cl.
*G02F 1/35*　　　(2006.01)
*C09D 11/38*　　(2014.01)
(Continued)

(52) U.S. Cl.
CPC .............. *G02F 1/353* (2013.01); *C09D 11/38* (2013.01); *C09D 11/52* (2013.01); *G02F 1/354* (2021.01);
(Continued)

(58) Field of Classification Search
CPC ........ G02F 1/353; G02F 1/354; G02F 1/3556; G02F 2202/10; G02F 2203/13; C09D 11/38; C09D 11/52
See application file for complete search history.

(56) References Cited

U.S. PATENT DOCUMENTS

| | | | |
|---|---|---|---|
| 10,495,703 B2 * | 12/2019 | Hwang | .................. G01N 24/10 |
| 2014/0051237 A1 | 2/2014 | Lockett et al. | |
| 2019/0002719 A1 | 1/2019 | Pousthomis et al. | |

FOREIGN PATENT DOCUMENTS

| | | | | |
|---|---|---|---|---|
| CN | 110857369 A | * | 3/2020 | ............. C09D 11/52 |

OTHER PUBLICATIONS

International Search Report and Written Opinion mailed May 27, 2022 in PCT/GB2022/050534 (11 pages).
(Continued)

*Primary Examiner* — Daniel Petkovsek
(74) *Attorney, Agent, or Firm* — Meunier Carlin & Curfman LLC

(57)　　　ABSTRACT

There is disclosed a method of generating terahertz radiation which comprises: (a) depositing an ink on a substrate (2), wherein the ink comprises particles (3) of a semiconductor; (b) allowing the ink to form a coating; (c) shining a laser onto the coating so as to generate terahertz radiation.

18 Claims, 18 Drawing Sheets

Figure 1:
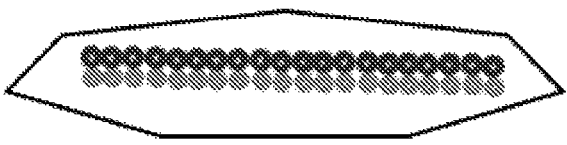
Figure 1:
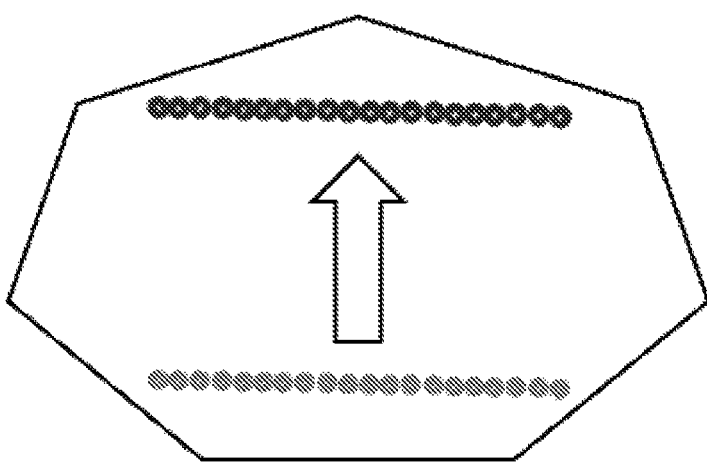

(51) Int. Cl.
      C09D 11/52       (2014.01)
      G02F 1/355       (2006.01)

(52) U.S. Cl.
      CPC ........ G02F 1/3556 (2013.01); *G02F 2202/10*
            (2013.01); *G02F 2203/13* (2013.01)

(56)                References Cited

OTHER PUBLICATIONS

Kato Kosaku et al., "Tetrahertz wave generation from spontaneously formed nanostructures in silver nanoparticle ink," Optics Letters, 2016, 41(9), 2125-2128.
V.L. Malevich et al., "THz emission from semiconductor surfaces," C. R. Physique, 2008, 9, 130-141.
L Peters et al. "High-energy terahertz surface optical rectification," Nano Energy, 2018, 46, 128-132.

* cited by examiner (a)

(b)

METHOD OF GENERATING TERAHERTZ EMISSION USING AN INK

The project leading to this application has received funding from the European Research Council (ERC) under the European Union's Horizon 2020 research and innovation programme (grant agreement No 725046 and No 862258).

FIELD OF THE INVENTION

The present invention relates to a method of generating terahertz emission using an ink which is applied to a substrate.

BACKGROUND OF THE INVENTION

Terahertz (THz) waves are electromagnetic waves that lie between infrared and microwaves in the electromagnetic spectrum and are therefore within the frequency range of about $0.1 \times 10^{12}$ Hz to about $10 \times 10^{12}$ Hz (or within the wavelength range of about 3 mm to about 30 μm). THz waves have become a highly promising tool for real-time spectroscopy analysis of a wide variety of materials. Access to the THz electromagnetic band has been limited for a long time by the lack of cost-effective and practical intense sources.

There is an increased need in biology, security, environmental monitoring and industry in general for low-cost technologies that allow for fast and in situ chemical analysis, which can be met by using THz spectroscopy. For example, bio-matter compounds such as proteins, amino-acids and DNA possess specific resonances in the THz band, meaning that some of these molecules can be readily identified by their THz resonances. In addition, the non-ionising nature of THz waves makes them mostly non-destructive, and therefore compatible with biological systems. THz waves can also pass through many packaging materials, including ceramics, paper, cardboard, plastics, certain kinds of glasses and clothes, so THz spectroscopy has been proposed for use in security scanners.

In terms of practical devices presently forming part of the state of the art, one of the most representative forms of THz emitter is the photoconductive switch, which consists of a small electrically-biased metallic antenna on a semiconductor, usually produced by photo-lithography. It typically emits a short THz pulse when triggered by an ultrashort laser pulse. Such emitters are commonly used in time-domain spectrometers.

A common alternative to photoconductive switches is special optical (nonlinear) crystals, where a short THz pulse is generated by a nonlinear optical process triggered by an ultrashort intense laser pulse, as available from state-of-the-art laser sources.

For example, it is well known that THz radiation can be produced with relatively high efficiency via optical rectification in quadratic non-centrosymmetric nonlinear crystals. Optical rectification generally relates to the formation of a quasi-DC polarisation, which is generated as an intense optical pulse passes through a nonlinear medium.

It is known in the art that THz radiation may be produced from the surface of semiconductor crystals as the result of several different mechanisms which do not rely on a quadratic crystal response. For example, it is known that this can happen when narrow bandgap III-V semiconductors, such as indium arsenide (InAs) and indium antimonide (InSb), are excited with ultrashort optical pulses.

Finally, it has been established that nanostructures deposited on surfaces can be used to generate THz pulses. For example, spintronic THz emitters consist of stacks of metallic and magnetic layers of quite specific nanometric thicknesses deposited on extremely flat surfaces.

Although the solutions discussed above are established, they are not easily scalable. This is because the cost and fabrication complexity of emitters with surfaces above the $cm^2$ scale increases exponentially with their size. For photoconductive switches, this is due to well-known challenges in fabricating devices over a large area, such as the limited scalability of planar fabrication processes and the technological complexity of creating arrays of antennas. These challenges extend to all devices requiring planar fabrication processes with micrometric and nanometric resolution.

For benchmark crystalline emitters operating via optical rectification, the need to create high-quality crystals with standard fabrication processes inherently creates a critical exponential trade-off between dimensions and costs. As the generation mechanism relies on long-range crystallographic order, the generation from amorphous, polycrystalline or powdered nonlinear materials is generally negligible. Said differently, generation from randomly oriented crystals does not interfere constructively.

Another disadvantage is that such solutions cannot be easily integrated with other existing technologies or materials. Besides, they are all unsuitable to be deployed on substrates with arbitrary shapes.

Other solutions exploit printing technologies that permit the design and rapid fabrication of microstructures and nanostructures for printed electronic and photonic applications. For example, Kato et al., "Terahertz wave generation from spontaneously formed nanostructures in silver nanoparticle ink", Optics Letters, 41, 2125 (2016), discloses THz pulse generation from metallic nanostructures under irradiation by femtosecond laser pulses, wherein the metallic nanostructures are created from a silver nanoparticle ink. However, to create the nanostructures, a substrate must be coated by the ink with specialised approaches and subsequently baked at a high temperature relative to room temperature. The THz generation mechanism is due to plasmon resonances excited by the laser pulse irradiation, which lead to a temporal variation of induced nonlinear dipole moments and consequently, the generation of THz waves.

Although large-area THz emitters could potentially be obtained by using the metal nanoparticle ink suggested by Kato et al., the requirement of subsequent baking poses additional restrictions in the fabrication process. These include an upper size limit restricted by the capacity of the baking apparatus; a restriction in the types of substrates available to those that can be subject to the baking process without being adversely affected; and further costs associated with running the baking process.

Furthermore, the properties of the THz emission induced by a laser pulse of a particular polarisation depend critically on the post-baking morphological features of the nanostructures, hence requiring highly precise control of the process against its variability with the sample specifications. In addition, the solution provides a relatively weak terahertz emission and does not address the problem of creating morphologically complex sources and controlling the nature of the THz emission.

As a result, having a "wall-size" emitter capable of generating intense THz radiation when excited by non-THz radiation at an arbitrary point of the surface of a substrate is currently beyond the state-of-the-art capabilities.

It would be desirable, therefore, to provide a simple method to functionalise a substrate (for example plastic, paper, glass or other surfaces) or product (for example, a luxury item, a commercial good, or a piece of artwork) with the means of emitting THz waves when illuminated with non-THz radiation.

It would be particularly desirable if the method of depositing the means of emitting THz waves on a substrate could be done through conventional processes, and further if the only post-deposition requirement was interaction with air.

It would also be desirable to provide control of the emission spectrum of the THz waves (such as by encoding specific features within the spectrum) by acting on the degrees of freedom available during fabrication or deposition, in such a way that a large area could exhibit regions with different emission.

SUMMARY OF THE INVENTION

In one aspect, the present invention provides a method of generating terahertz radiation which comprises:
- (a) depositing an ink on a substrate, wherein the ink comprises particles of a semiconductor;
- (b) allowing the ink to form a coating; and
- (c) shining a laser onto the coating so as to generate terahertz radiation.

The ink may comprise a carrier such as water or an organic solvent (e.g. cyclohexane or isopropanol), and may also comprise a binder such as polyvinyl alcohol, polyvinylpyrrolidone, cellulose derivatives, polystyrene, cellulose acetate, thermoplastic and thermoset polymers, and combinations thereof.

In another aspect, the invention provides a method of generating terahertz radiation which comprises:
- (a) depositing an ink on a substrate, wherein the ink comprises particles of a semiconductor and particles of a contaminant material, wherein the contaminant material is different from the semiconductor;
- (b) allowing the ink to form a coating; and
- (c) shining a laser onto the coating so as to generate terahertz radiation.

The nature of the terahertz radiation can be determined or changed by the contaminant material, such that changing the amount and/or nature of the contaminant material produces terahertz radiation with a different distribution.

In another aspect, the invention provides a method of generating terahertz radiation which comprises:
- (a) depositing an ink on a substrate, wherein the ink comprises particles of a semiconductor;
- (b) allowing the ink to form a coating;
- (c) shining a laser onto the coating so as to generate a first distribution of terahertz radiation, wherein at least a part of the coating is at a first temperature;
- (d) heating or cooling said at least a part of the coating to a second temperature different to the first temperature; and
- (e) shining a laser onto the coating so as to generate a second distribution of terahertz radiation different to the first distribution of terahertz radiation.

In another aspect, the invention provides a method of generating terahertz radiation which comprises:
- (a) depositing an ink on a substrate, wherein the ink comprises particles of a semiconductor and particles of a magnetic material, wherein the magnetic material is different to the semiconductor;
- (b) allowing the ink to form a coating, and then exposing the coating to a magnetic field;

- (c) shining a laser onto the coating so as to generate terahertz radiation.

The magnetic field may be removed before shining a laser onto the coating, such that step (c) comprises removing the magnetic field and subsequently shining a laser onto the coating so as to generate terahertz radiation.

In another aspect, the present invention provides a method of generating terahertz radiation which comprises:
- (a) depositing an ink on a substrate, wherein the ink comprises particles of a semiconductor and particles of a magnetic material, wherein the magnetic material is different to the semiconductor;
- (b) allowing the ink to form a coating; and
- (c) shining a laser onto the coating so as to generate a first distribution of terahertz radiation;
- (d) exposing the coating to a first magnetic field;
- (e) shining a laser onto the coating so as to generate a second distribution of terahertz radiation different to, and preferably stronger than, the first distribution of terahertz radiation.

Preferably the second distribution of terahertz radiation is stronger than the first distribution of terahertz radiation.

In another aspect, the invention further comprises:
- (f) exposing the coating to a second magnetic field;
- (g) shining a laser onto the coating so as to generate a third distribution of terahertz radiation, different to and in place of the second distribution of terahertz radiation.

In this method, the first magnetic field is removed either before shining the laser during step (e), or after step (e) and before step (f).

In this method, the second magnetic field may be removed either before shining the laser during step (g), or after step (g).

The second magnetic field is preferably perpendicular to the first magnetic field.

The third distribution of terahertz radiation may comprise reduced THz radiation compared to the second distribution of terahertz, such as substantially no THz radiation.

The invention also provides an ink comprising a carrier, particles of a semiconductor, and contaminant particles.

The invention also provides an ink comprising a carrier, particles of a semiconductor, and a magnetic material.

LIST OF FIGURES

FIG. 1: Schematic of differences in THz generation in relation to particle size.

Figure 2:
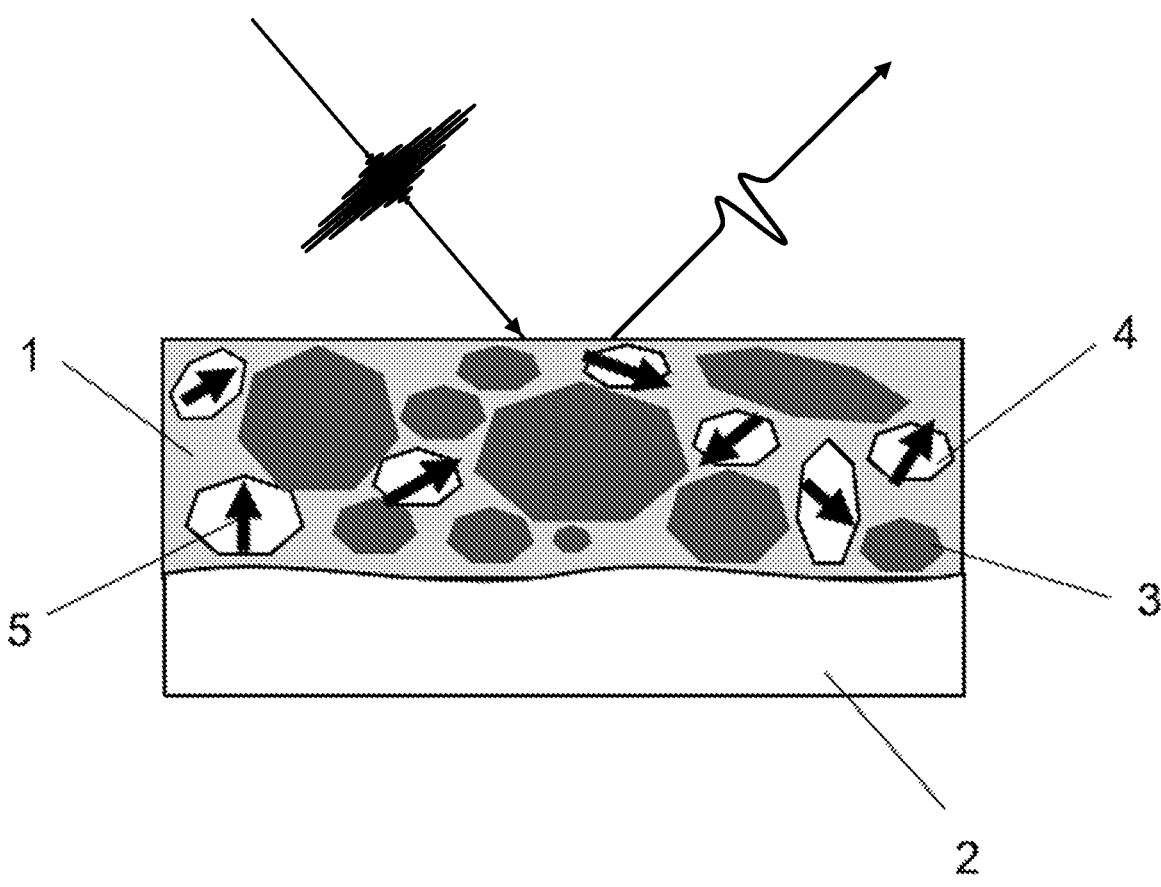
Figure 3:
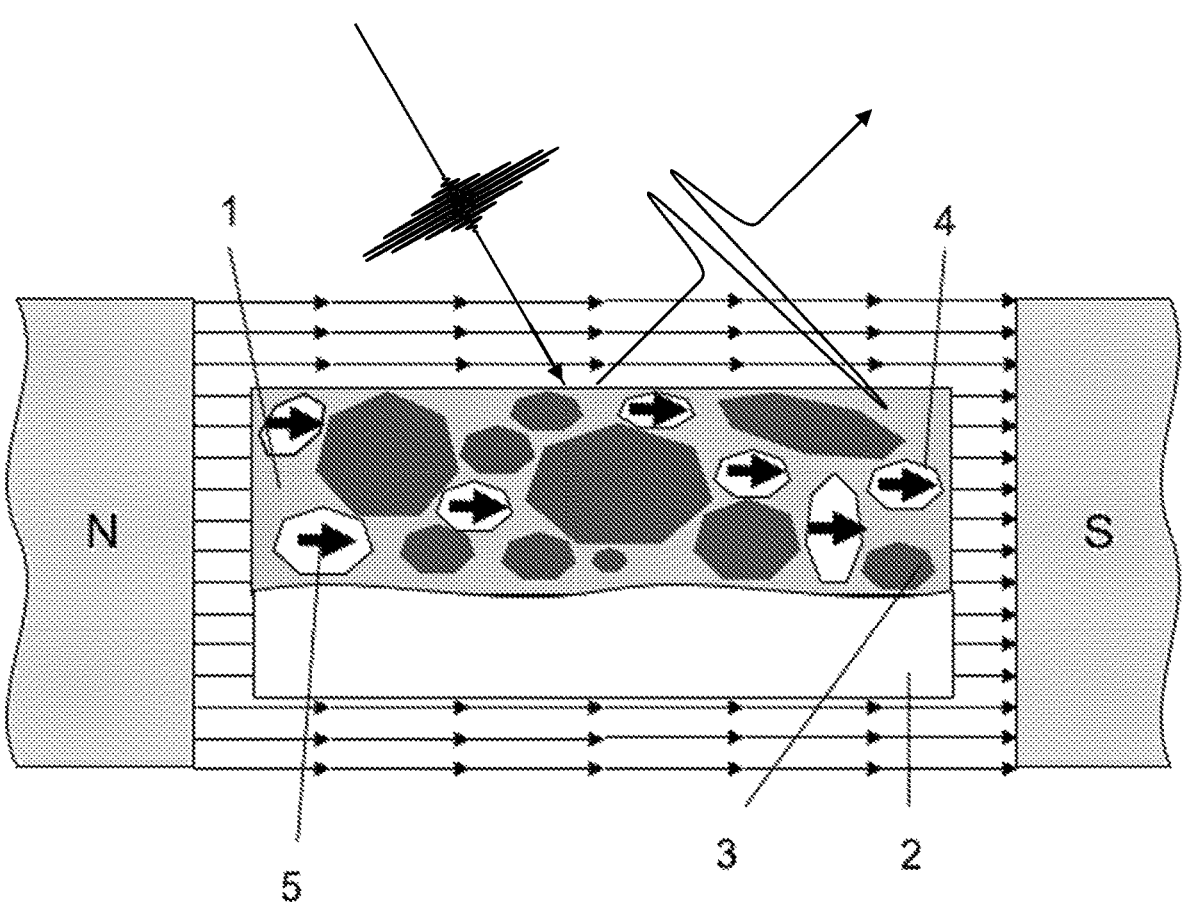
Figure 4:
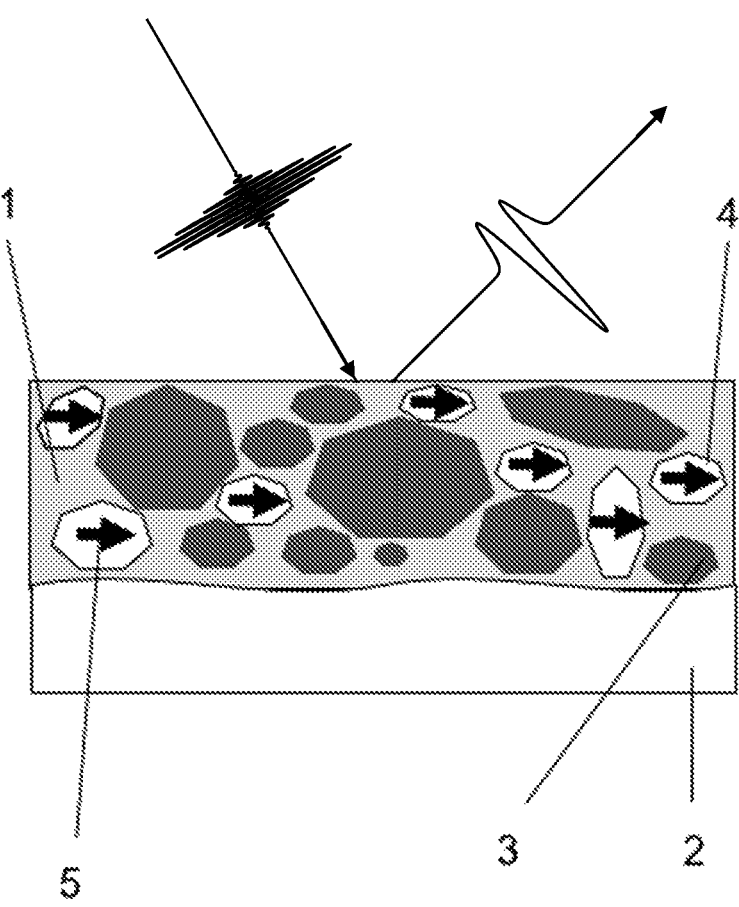

FIGS. 2-4: Schematics of THz generation from particles with magnetic contaminants.

Figure 5:
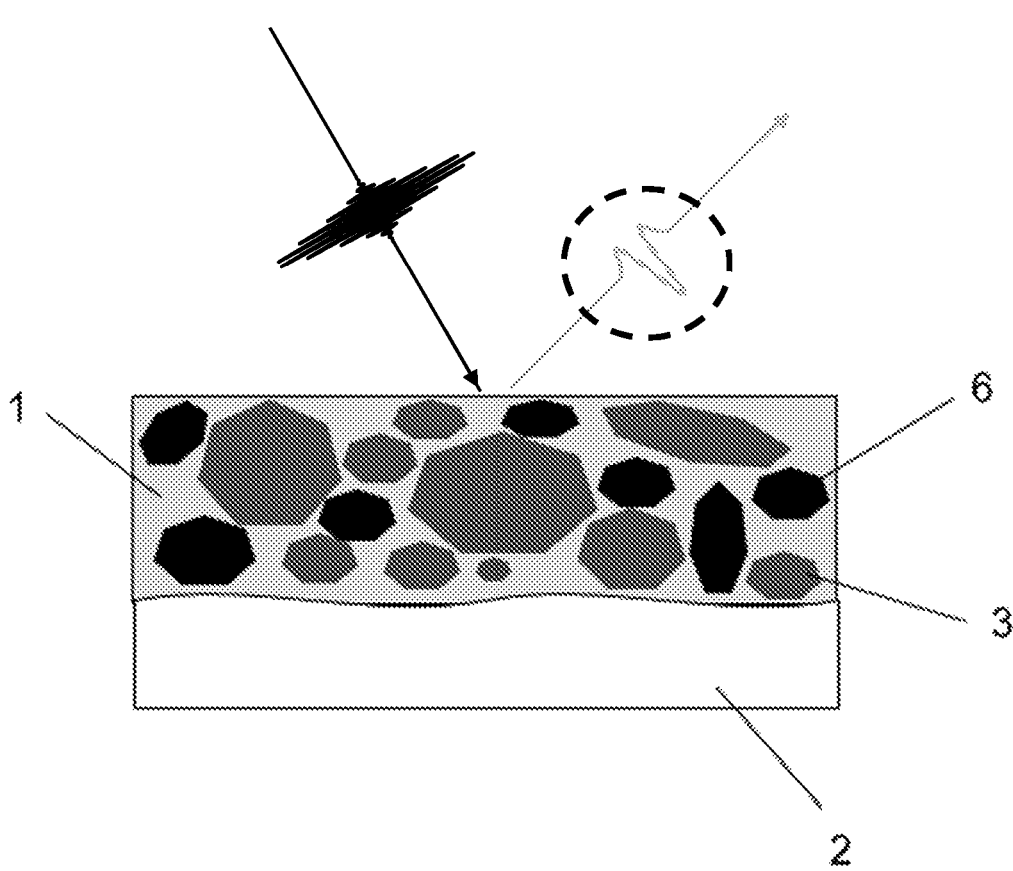
Figure 6:
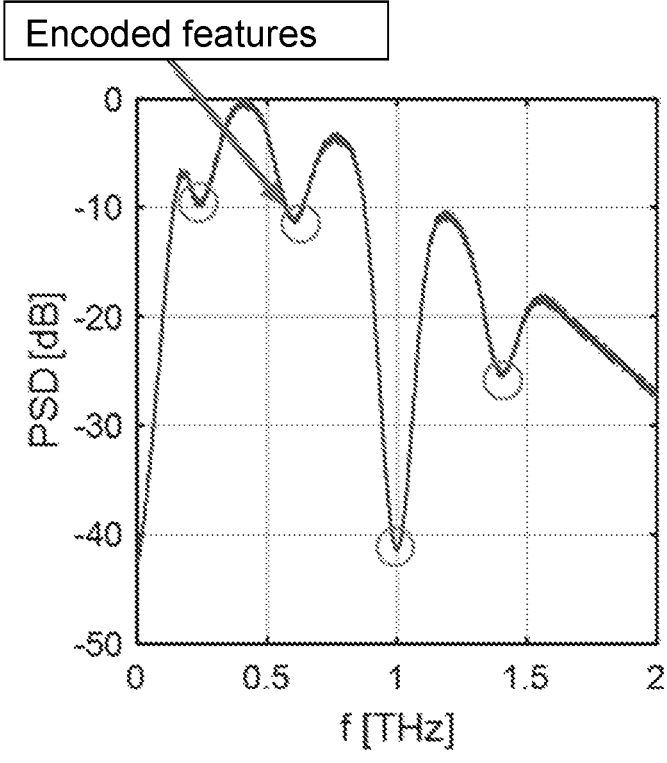

FIGS. 5 and 6: Schematic of THz generation from particles with THz absorbing contaminants and a representation of spectral encoding.

Figure 7:
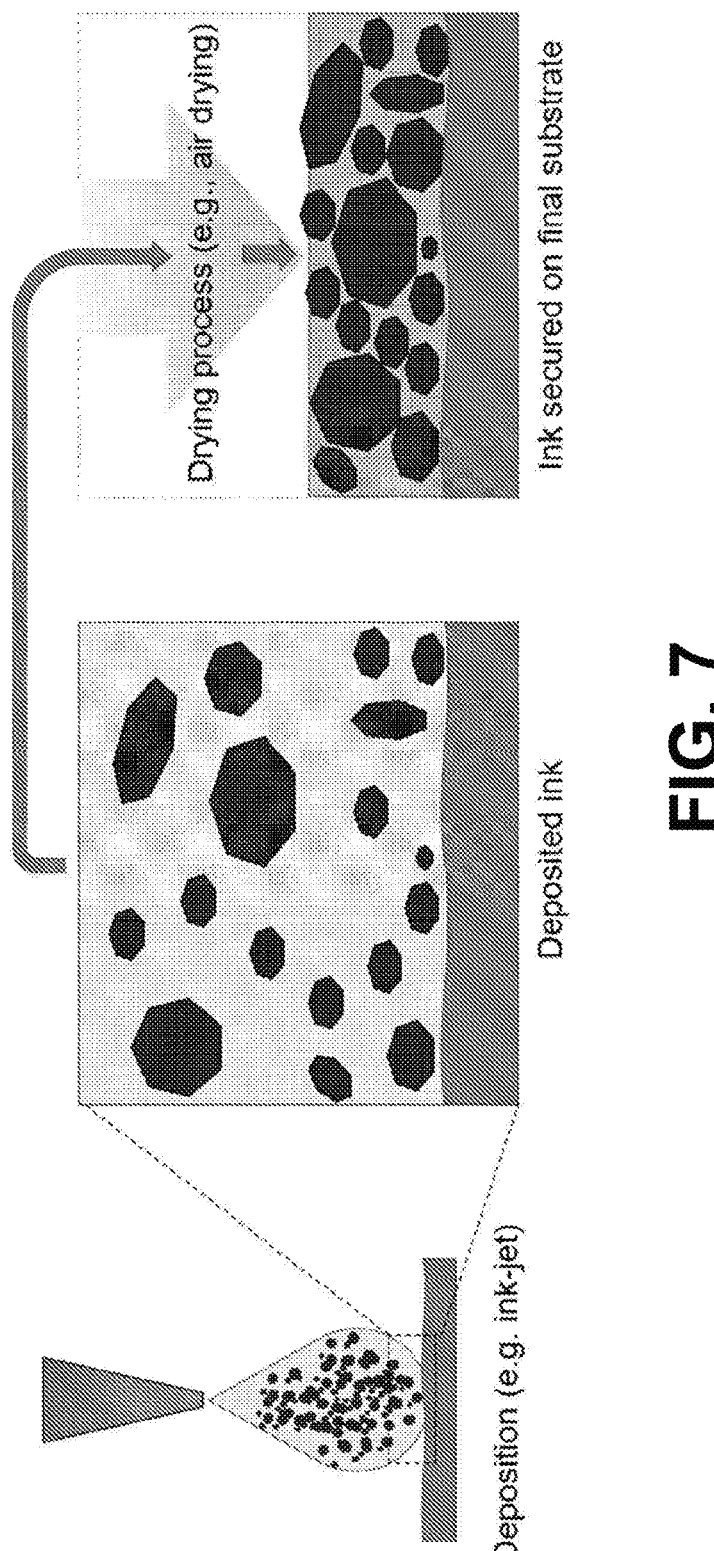

FIG. 7: Representation of the deposition of the ink described herein on a substrate and subsequent drying.

Figure 8:
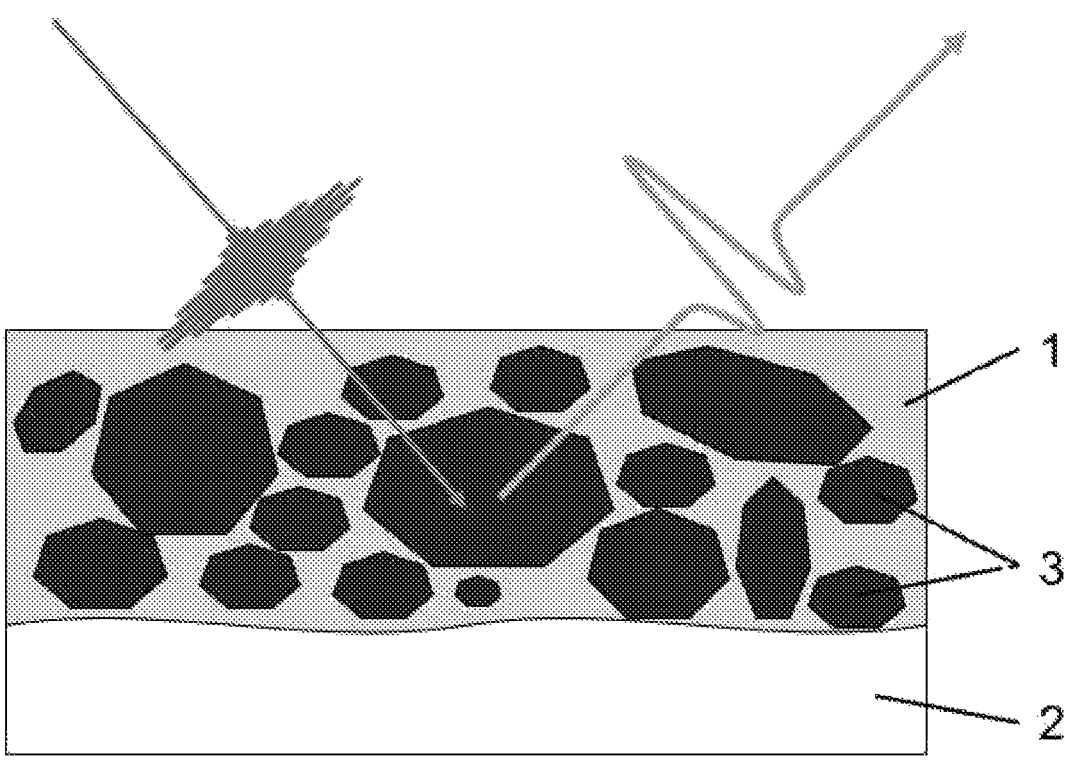

FIG. 8: Schematic of THz generation from particles on a substrate.

Figure 9:
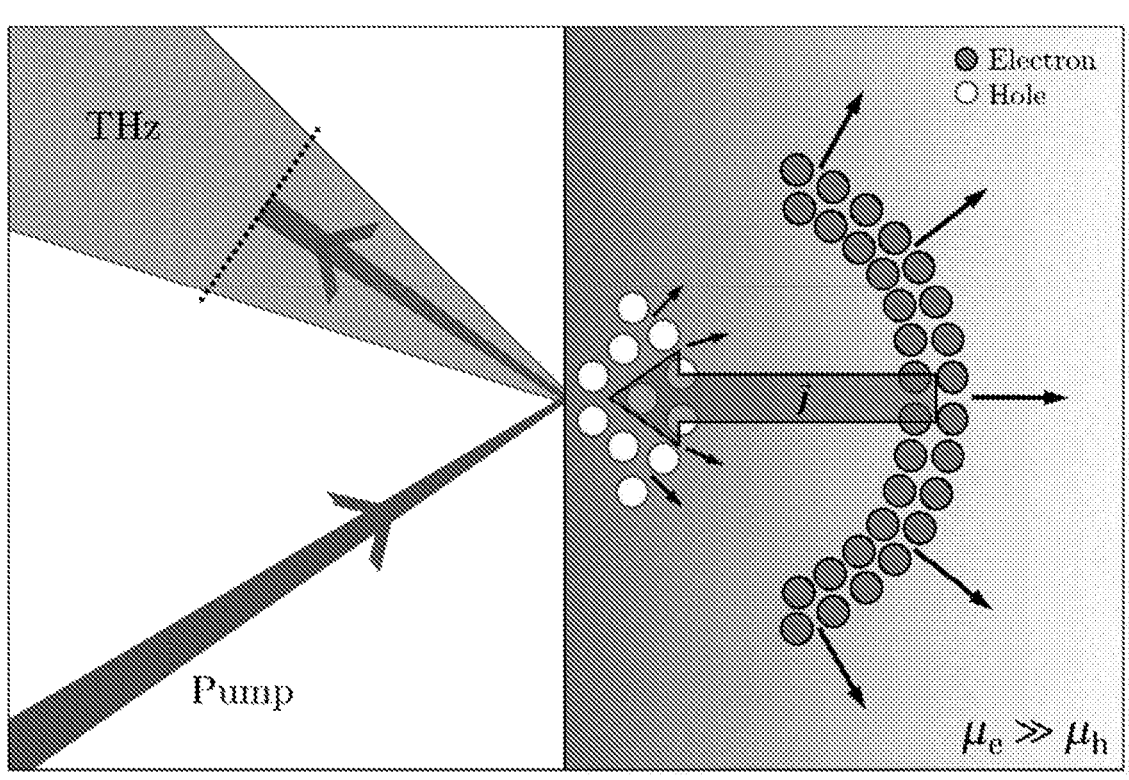

FIG. 9: Schematic of the photo-Dember effect at the surface of an InAs wafer.

Figure 10:
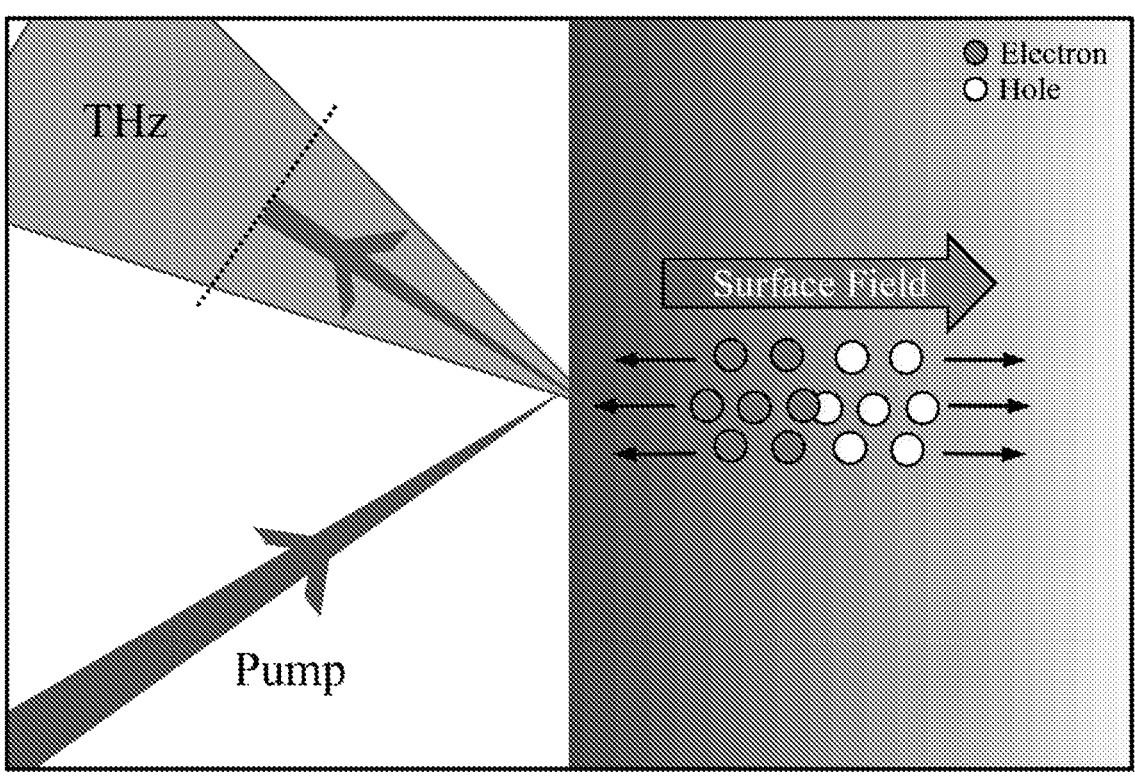

FIG. 10: Schematic of surge-current THz emission.

Figure 11:
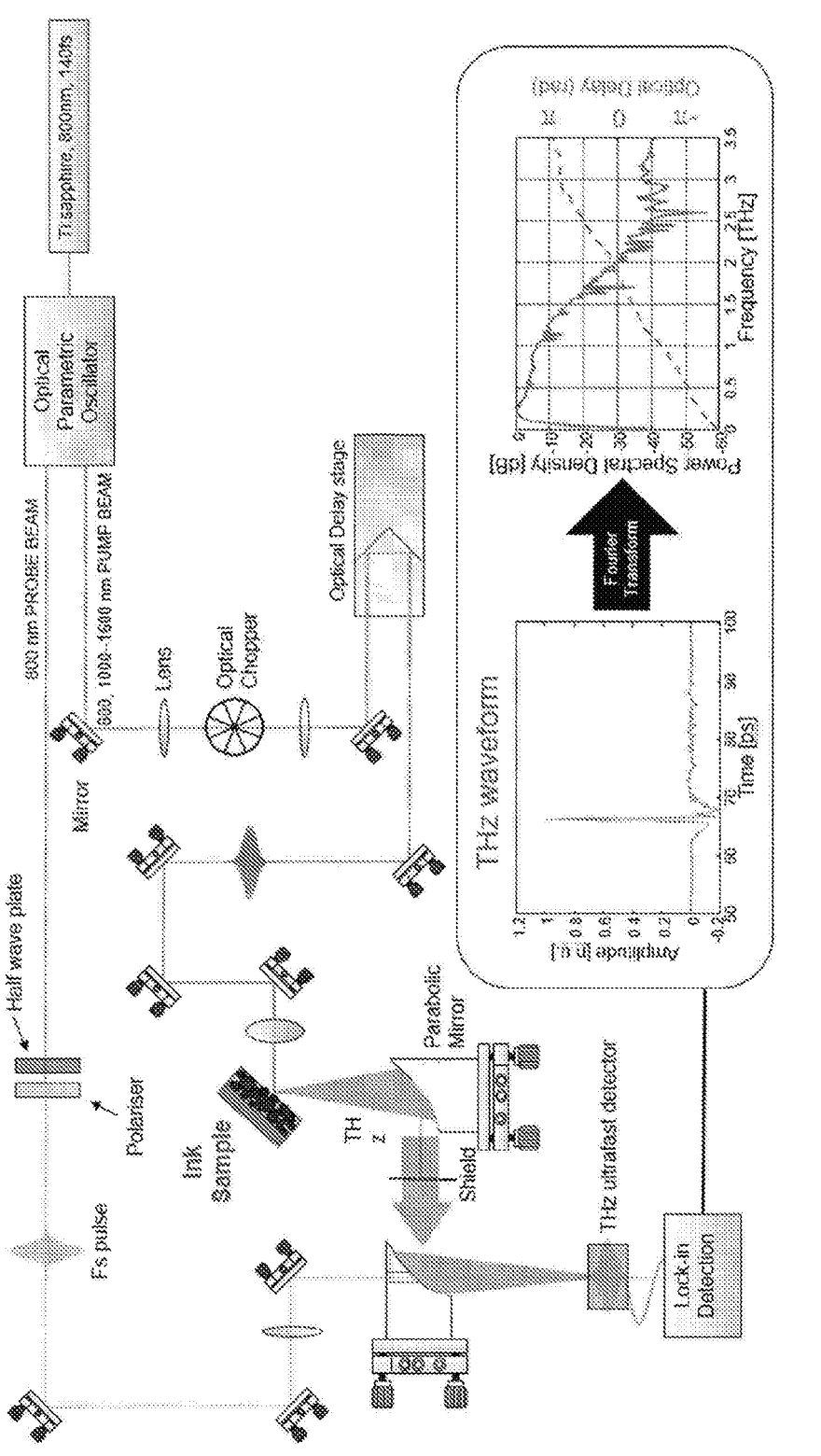

FIG. 11: Illustration of an experimental setup for the simultaneous excitation and characterisation of the ink described herein.

Figure 12:
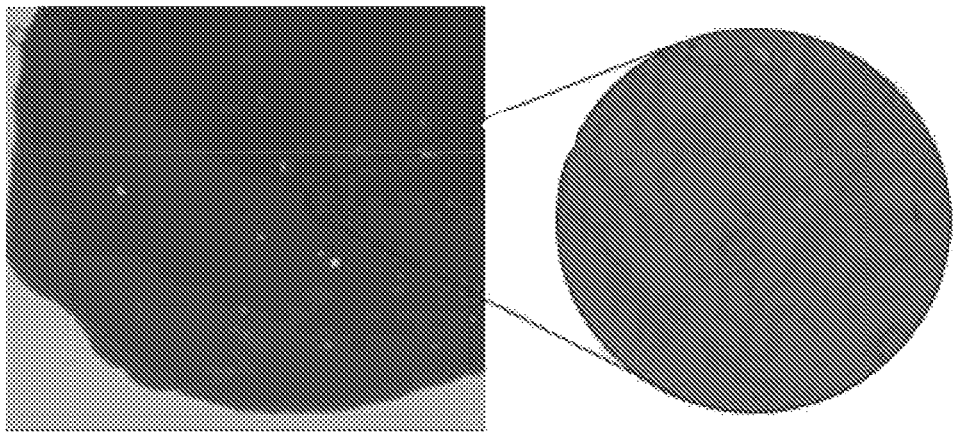

FIG. 12: Microscopy image of an ink suitable for use in the method of the invention.

Figure 13:
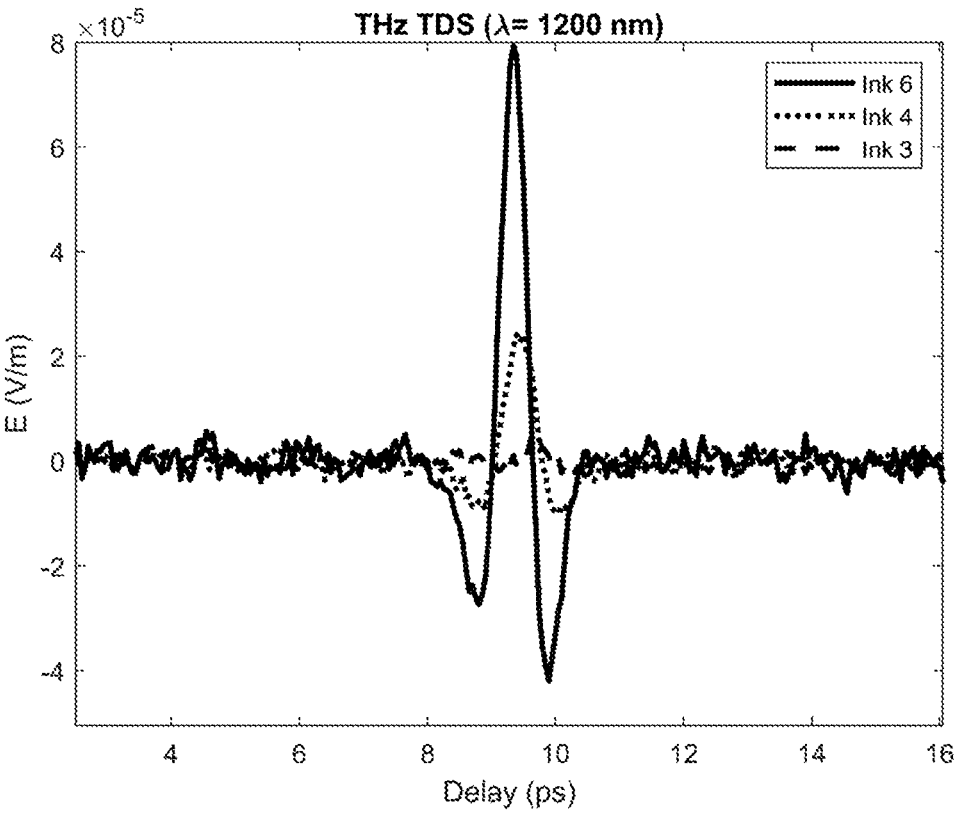
Figure 14:
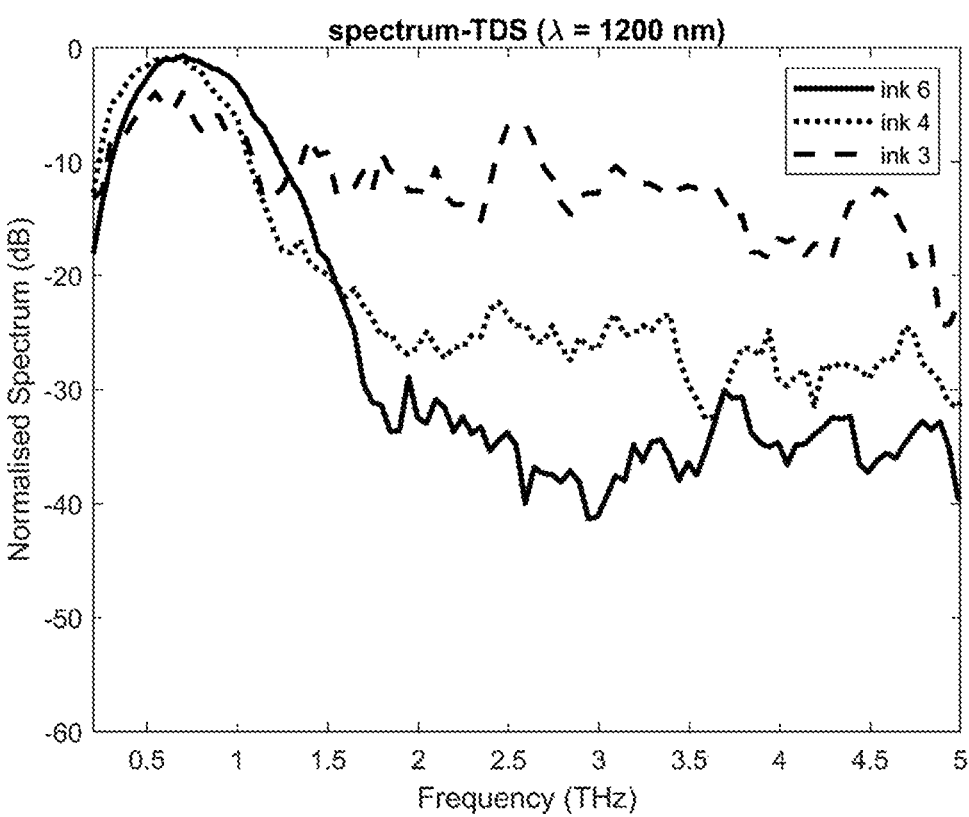

FIGS. 13 and 14: Graphs of the typical electric field traces of the THz emission from three types of ink.

Figure 15:
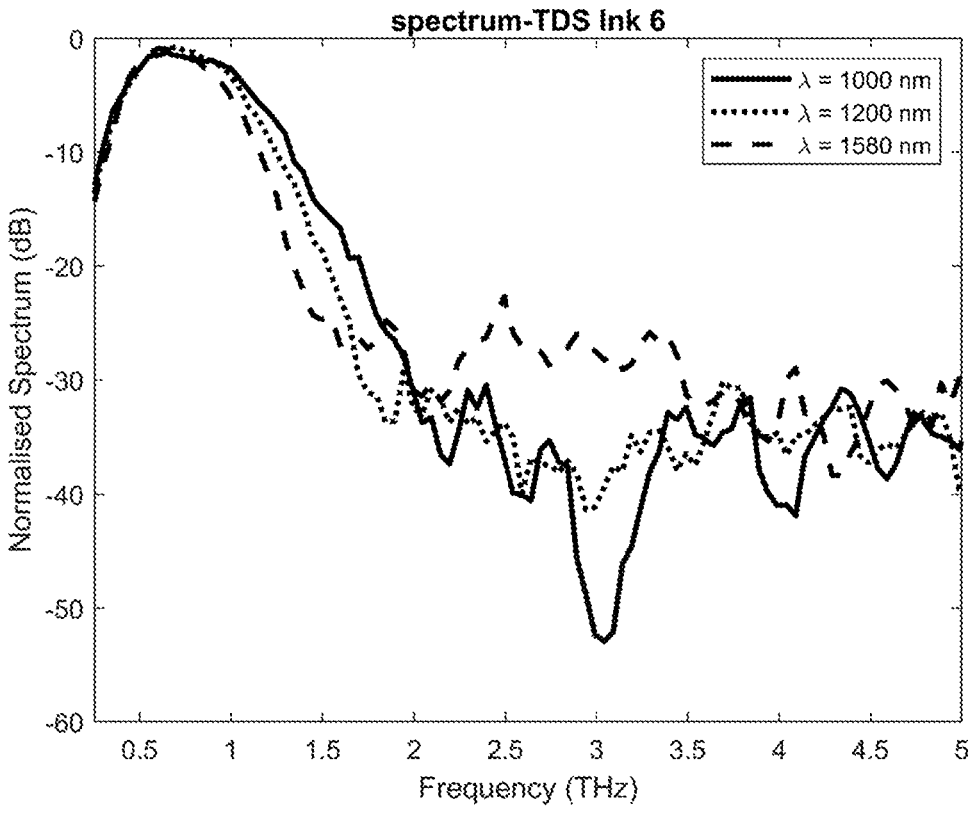

FIG. 15: Illustration of the THz field traces as a function of the pump wavelength for different samples.

Figure 16:
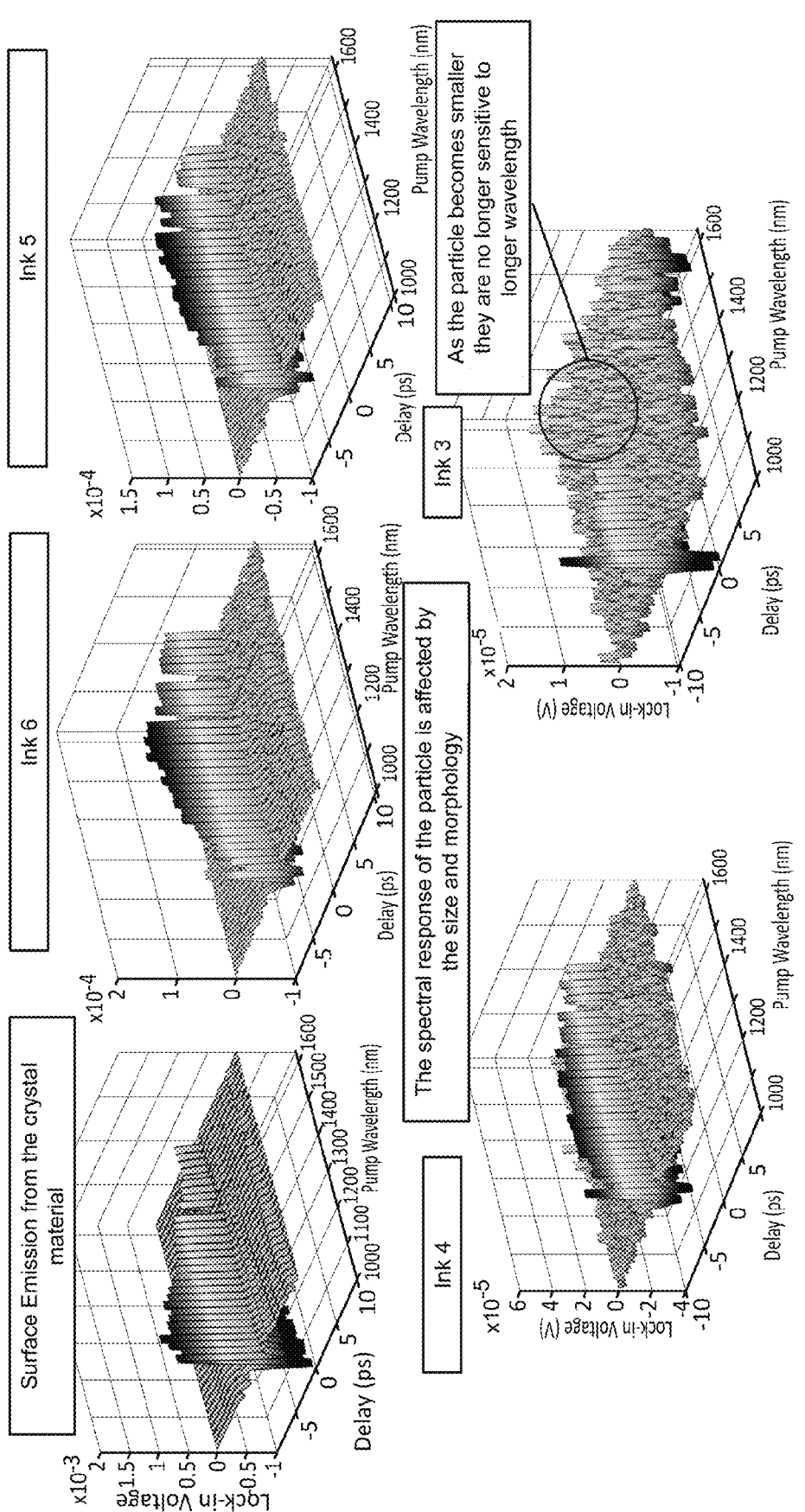

FIG. 16: Illustration of how the particle size and morphology affects the sensitivity to a specific excitation wavelength.

Figure 17:
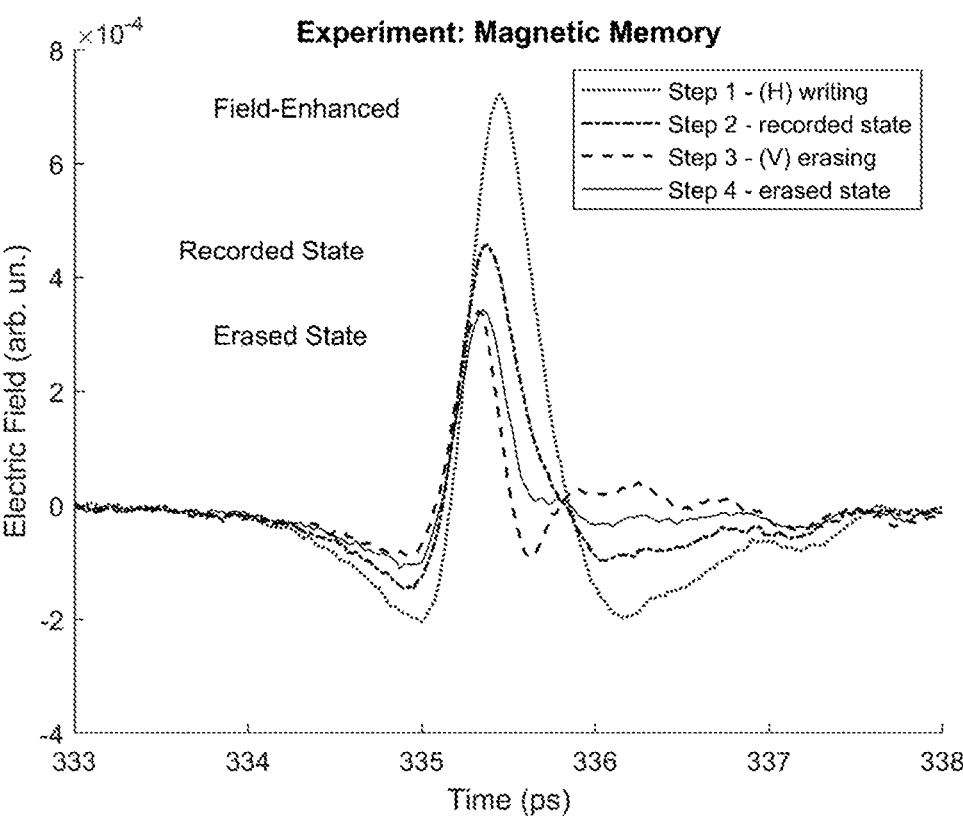

FIG. 17: Illustration of the experimental demonstration of the terahertz wave emitted by ink with magnetic particles undergoing magnetic writing (step 1), reading of the recorded state (step 2), magnetic erasing (step 3), and reading of the erased state (step 4).

Figure 18:
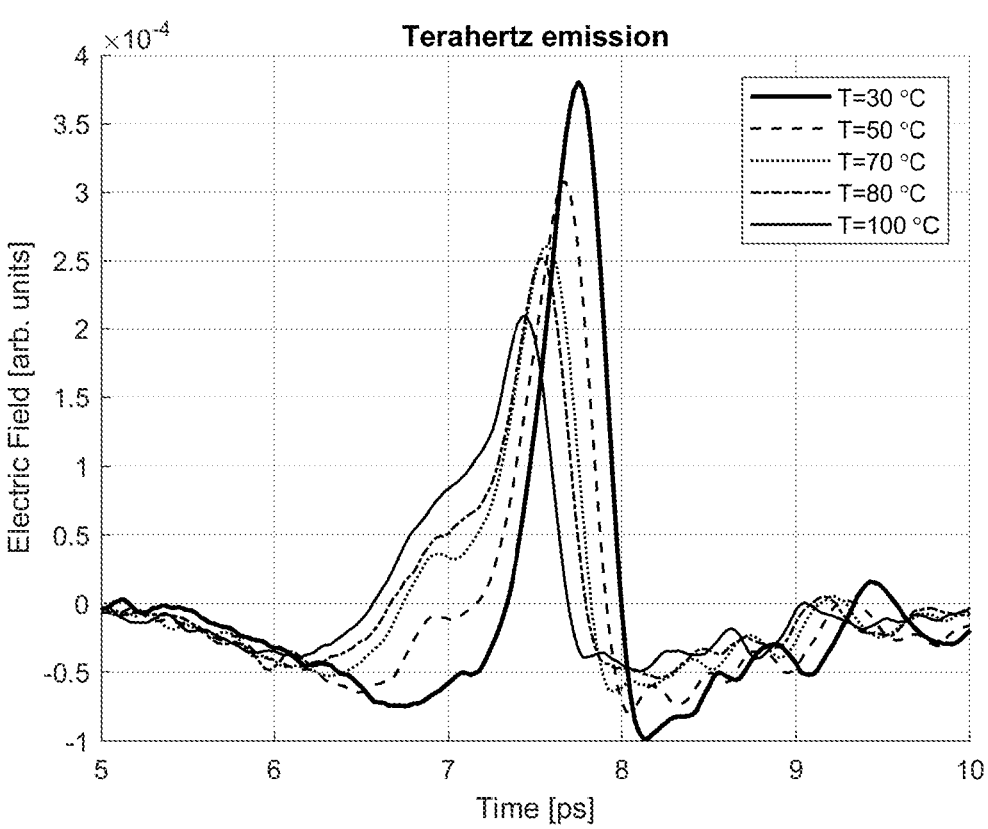

FIG. 18: Illustration of an experimental demonstration of how the temperature may affect the THz radiation generated from a given coating.

DETAILED DESCRIPTION OF THE INVENTION

The concepts described herein generally relate to approaches for generating THz radiation from a substrate. In particular, the methods described herein involve the deposition of semiconductor particles onto a substrate to form a coated substrate such that the coated substrate has an interface between the semiconductor particles and the surrounding medium (which is preferably air). THz radiation can then be generated through a surface-emission mechanism which is excited via illumination with a laser pulse. Example mechanisms include the photo-Dember effect, surge-current emission or surface optical rectification.

Substrate

The method of the present invention involves depositing an ink on a substrate. Any substrate onto which an ink can be deposited can be used, and the skilled person would be well aware of suitable substrates.

Some examples of suitable substrates include, but are not limited to, metals, plastics, and any cellulose-based product in sheet or web form such as paper, paperboard and cardboard.

The substrate may also be a heat resistant substrate such as glass, ceramic, high-temperature plastics, or carbon fibre. Since the ink absorbs most of the laser illumination, using a heat-resistant substrate allows the average incident pumping power to be increased, hence enabling brighter THz emission.

The substrate may be a single-layered or multi-layered substrate.

It is understood that the substrate need not comprise a substantially planar surface. Rather, the substrate may comprise a non-planar surface onto which the ink is deposited.

Ink

The ink used in the present invention comprises particles of a semiconductor. The ink can therefore be understood to be a dispersion of semiconductor particles in a carrier or host material. That is, the ink comprises a carrier in addition to the particles of a semiconductor.

Thus, in one aspect step (a) of the method of the invention comprises:

(a) depositing an ink on a substrate, wherein the ink comprises a carrier and particles of a semiconductor.

The ink may be in the form of an emulsion.

In order to fabricate the ink, particles of semiconductor material are formed. The skilled person would be aware of suitable processes for forming semiconductor particles. For example, the particles may be produced by mechanically grinding a semiconductor material by any suitable means. Alternatively, particles of semiconductor material can be purchased.

Control over the geometrical parameters of the particles is achieved by particle selection or by specific fabrication processes. Alternatively, particles of semiconductor material can be purchased and further post-processed to meet specifications. The nature of the terahertz emission and the compatibility with the desired application (e.g. ink-jet printing) may define the geometrical parameters of the particles.

Before being dispersed in a carrier, the particles may be sonicated, centrifuged or otherwise sorted by size (e.g. using a mesh). The particles may also be sorted by shape.

The particles are then dispersed in a carrier. The skilled person would be aware of suitable carriers which may be used. Suitable carriers may include, but are not limited to, water and/or organic solvents. Suitable organic solvents include cyclohexane and isopropanol.

The carrier may be non-polar. This may result in the carrier being transparent or substantially transparent to THz radiation. Thus, the carrier may be substantially transparent to THz radiation.

The carrier may have a low boiling temperature value. Typical desired values are in the range from about 50 degrees C. to about 110 degrees C. However, the carrier may have a boiling temperature of less than about 50 degrees C. or greater than about 110 degrees C. Preferably, the boiling temperature is about 50 degrees C. This may facilitate spray deposition. Thus, the chemical composition of the carrier may be selected to promote the deposition and/or adhesion of the particles on the substrate. The chemical composition of the carrier may be selected to prevent or hinder the sedimentation of the particles within the ink.

One or more physical parameters of the ink may be selected to prevent or hinder the sedimentation of the particles within the ink. Alternatively or additionally, one or more physical parameters of the ink may be selected to promote deposition and/or adhesion of the ink on the substrate.

Physical parameters of the ink may include viscosity, density, surface tension, and/or thermal conductivity. The physical parameters of the ink may be a function of the carrier physical parameters and/or the particle physical parameters. The carrier physical parameters may include viscosity, density, surface tension, and/or thermal conductivity.

The physical parameters of the ink, the particles, and/or the carrier may be temperature-dependent.

By way of example, the viscosity of the ink and/or the power delivered whilst sonicating the particles may be selected to slow sedimentation of the ink.

Particles

The ink used in the method of the invention comprises particles of a semiconductor material. Semiconductor materials suitable for surface-emission of THz radiation are known in the art.

For example, the skilled person would understand that in order to emit THz radiation as a result of the photo-Dember effect, the semiconductor material must simultaneously exhibit very high absorption at the excitation wavelength as well as significantly different mobility of the holes compared to the mobility of the electrons.

In another example, the skilled person would understand that in order to emit THz radiation as a result of surge-current emission or surface optical rectification, the semiconductor material must simultaneously exhibit very high absorption at the excitation wavelength and large surface fields. Surface fields may arise as a result of the charged states at the surface of the material.

Preferably the material should be a direct semiconductor exhibiting a bandgap energy 2 to 5 times lower than the excitation wavelength, such as 2-4 or 2-3 times lower. In some embodiments, the semiconductor material is a III-V semiconductor material such as GaN (gallium nitride), InN (indium nitride), InGaN (indium gallium nitride), GaP (gallium phosphide), InAs (indium arsenide), GaAs (gallium arsenide), AlGaAs (aluminium gallium arsenide), InP (indium phosphide), InSb (indium antimonide), GaSb (gallium antimonide), or combinations thereof.

In some embodiments, the semiconductor material comprises GaN (gallium nitride), InN (indium nitride), InGaN (indium gallium nitride), GaP (gallium phosphide), InAs (indium arsenide), GaAs (gallium arsenide), AlGaAs (aluminium gallium arsenide), InP (indium phosphide), InSb (indium antimonide), GaSb (gallium antimonide), or combinations thereof.

InAs (indium arsenide), InSb (indium antimonide) may be particularly suitable for near-infrared pulsed lasers (e.g. operating at a wavelength between 800 nm-1600 nm). Other materials such as InP (indium phosphide), GaAs (gallium arsenide), may be particularly suitable for excitation at lower wavelengths.

More preferably the semiconductor material is a low bandgap III-V semiconductor material. Even more preferably the semiconductor material has a bandgap in the range from about 0.18 eV to about 0.5 eV.

The semiconductor may be a direct semiconductor or a non-direct bandgap semiconductor. Preferably the semiconductor is a direct semiconductor.

Most preferably, the semiconductor material is InAs or InSb. For example, InAs or InSb may be used because of the larger differences in the mobility of the two charge carrier species, and their relatively high surface field.

In each case, the semiconductor may be doped to reduce or increase the conductivity. As would be understood by the skilled person, doping of the semiconductor material influences the efficacy of the surface-emission mechanisms by changing the electrical conductivity.

For example, the semiconductor material may be n-doped. Alternatively, the semiconductor material may be p-doped. Preferably, the semiconductor material is p-doped. The skilled person would understand that, for example in InAs, p-doping would reduce the overall conductivity, and thus in turn, increase the overall THz emission.

In some embodiments, the surface-emission mechanisms may be governed by photo-excited charge carrier dynamics. Therefore, the surface-emission mechanisms may be affected by the particle morphology.

For example, where the diffusion of photo-carriers governs the surface-emission via the Photo-Dember effect, the skilled person would understand that the emission mechanism is affected by the particle morphology. In a simplified model, small particles limit the charge separation and the magnitude of the transient current. As such, the particles require a minimum diameter below which surface emissions, such as the photo-Dember effect, are inhibited. That is, particles having a diameter below this value would emit negligible terahertz radiation or no terahertz radiation. This is shown in FIG. 1. Specifically, FIG. 1a shows a small particle size, where there is no Photo-Dember dipole and hence no THz emission. In contrast, FIG. 1b shows a larger particle size where there is macroscopic Photo-Dember dipole and hence enhanced THz emission.

It will be understood that the morphology of a particle also affects the surface potential or surface fields in the material. Hence, similar considerations apply for other surface-emission mechanisms mediated by the surface potential.

The particle size required for THz emissions depends on the specific material of the particle.

Similarly, because the penetration depth governs the surface-emission from the Photo-Dember effect, surge-current emission, and surface optical rectification, the skilled person would understand that the particle size required for THz emission is also dependent on the characteristic penetration depth of the material composing the particle.

The skilled person would also appreciate that, for a fixed material configuration, the penetration depth and the diffusion length of carriers may depend on the excitation wavelength. Consequently, the particle geometry may be selected to be optimised for the desired excitation wavelength.

Furthermore, it would also be understood that surface-emission mechanisms may depend on the temperature. For instance, it will be appreciated that temperature dependence is particularly relevant in low-band-gap semiconductors, e.g. in relation to the charge carrier dynamics in embodiments wherein the surface-emission mechanisms may be governed by photo-excited charge carrier dynamics.

Accordingly, it will be understood that, by changing the temperature of the particles (either by heating or cooling, preferably heating), the nature of the THz emission can be changed. The particles may be heated by shining a laser onto the particles (e.g. by shining a laser onto the coating formed from dried ink which includes the particles, as will become clear below). The particles may be otherwise selectively heated by a mechanism alternative, or in addition to, shining a laser thereon.

Particles which emit minimal or no terahertz radiation may, however, be used in the present invention as long as they are used in combination with particles which do emit terahertz radiation.

It is therefore preferred that at least some of the semiconductor particles have a hydrodynamic diameter within the range of about 500 nm to about 2000 nm. More preferably, at least some of the semiconductor particles have a hydrodynamic diameter within the range from 750 nm to about 1500 nm. Most preferably, at least some of the semiconductor particles have a hydrodynamic diameter within the range from about 1000 nm to about 1200 nm.

As used herein, the term "at least some of" preferably means that at least about 10 wt. % of the semiconductor particles have the specified diameter, more preferably at least about 25 wt. %, even more preferably at least about 50 wt. %, and most preferably at least about 90 wt. %.

Preferably, the semiconductor particles have a mean number average hydrodynamic diameter within the range of about 500 nm to about 2000 nm. More preferably, the semiconductor particles have a mean number average hydrodynamic diameter within the range from 750 nm to about 1500 nm. Most preferably, the semiconductor particles have a mean number average hydrodynamic diameter within the range from about 1000 nm to about 1200 nm.

Preferably, all of the semiconductor particles have a hydrodynamic diameter within the range from about 500 nm to about 2000 nm. More preferably, the semiconductor particles have a hydrodynamic diameter within the range from 750 nm to about 1500 nm. Most preferably, the semiconductor particles have a hydrodynamic diameter within the range from about 1000 nm to about 1200 nm.

The hydrodynamic radius can be assessed using standard characterisation techniques such as, for example, dynamic light scattering (e.g. in accordance with ISO standard 22412: 2017 "Particle Size Analysis—Dynamic light scattering (DLS)").

By suitable control of the parameters employed in the centrifugation process, the skilled person will understand that the average hydrodynamic diameter of the particles can be selected.

Furthermore, the geometry or morphology of the particles can be also controlled via relevant centrifugation parameters such as, for example, RT (g min) (where RT is the product of the relative centrifugal force in g and the centrifugation time, e.g. see Ogilvie et al., 2D Materials 6, 031002 (2019)). For example, choosing a slower centrifuge (that is, a lower value of RT) would result in particles with a morphology that is flatter than the particles produced in a faster centrifuge (that is, a higher value of RT), which are rounder.

Preferably, the particles have a shape that is flat or slate-like. The particles preferably have an aspect ratio (length to thickness) of greater than 1, preferably greater than about 5. More preferably, the aspect ratio is from about 5 to about 100. Even more preferably, the aspect ratio is from about 10 to about 50. Most preferably, the aspect ratio is from about 15 to about 25.

Preferably, the length of the particles ranges from about 500 nm to about 1000 nm and the thickness of the particles ranges from about 50 nm to about 250 nm. Such particles may be produced using a centrifuge with an RT value within the range from about 10 g·min to about 1000 g·min, preferably from about 20 g·min to about 200 g·min.

Binder

The ink preferably contains a binder to improve cohesion and/or adhesion of the ink or the particles on the substrate.

The binder may comprise polyvinylalcohol, polyvinylpyrrolidone, cellulose derivatives, polystyrene, cellulose acetate, thermoplastic and thermoset polymers, or combinations thereof.

For example, when the carrier comprises water, the binder may comprise polyvinylalcohol, polyvinylpyrrolidone, cellulose derivatives, or combinations thereof.

When the carrier comprises an organic solvent, the binder may comprise polystyrene, cellulose acetate, or combinations thereof.

The binder and/or the shape of the particles may affect the thermal conductivity between the particles and the substrate. A skilled person would understand that, after heating the coating (for instance, by shining a laser onto the coating), the temperature of the particles can be higher than the temperature of the coated object.

Contaminants

Contaminant particles other than the particles of the semiconductor material (i.e. the primary material) may be introduced into the ink. The inclusion of contaminant particles may alter the emission properties of the coated surface. For example, the emission spectrum or the radiation pattern of the generated THz radiation of the coated surface comprising particles of primary material may be altered by the addition of contaminant particles. This is because the contaminant particles may absorb or selectively absorb THz radiation. By "selectively absorb" it is meant that the contaminant particles absorb only certain wavelengths of THz radiation.

The inclusion of contaminant particles may alter the emission spectrum from the particles of the primary material when irradiated by a laser of a particular wavelength and/or the contaminant particles may produce a different spectrum than that produced by the particles of the primary material when irradiated by a laser of a particular wavelength. The different spectral contributions may combine in such a way that the overall spectrum produced by the coated surface is more complex than a surface coated only with the primary material.

Said another way, the nature of the terahertz radiation can be determined by the contaminant, such that changing the contaminant material produces terahertz radiation with different properties.

The contaminant particles may also have different thermal properties to thereby alter the emission spectrum or the radiation pattern of the generated THz radiation from the primary material. For instance, in embodiments wherein the generated THz radiation from the primary material is temperature dependent (e.g., as discussed above and below in relation to FIG. 18), when irradiated by the laser used to generate THz radiation from the primary material, the contaminant particles may absorb energy from the laser and change temperature (i.e. heat up), which in turn subsequently acts as a heat source to the primary material, increasing the temperature of the primary material and therefore altering the generated THz radiation from the primary material. Conversely, the contaminant particles may have a thermal conductivity so as to act as a heat sink to the primary material towards the coated objected, thereby conducting the heat inherently generated in the primary material via absorption of the laser, thereby affecting the temperature reached by the primary material and thus altering the generated THz radiation from the primary material.

A skilled person would understand that the surface-emission mediated by carrier dynamics can be affected by the presence of magnetic fields.

FIGS. 2-4 illustrate the possibility of affecting the properties of the THz emission from an ink containing magnetic contaminant particles. FIG. 2 shows a coating (i.e. a dried ink) on a substrate (2), where the ink forming the coating comprises a binder (1) hosting semiconductor particles (3) and contaminant particles (4). It will be understood that, although FIG. 2 shows a binder (1) to be present as part of the coating, the regions of the coating between the semiconductor (3) and contaminant particles (4) do not need to include a binder.

FIG. 2 shows contaminant particles each with a respective magnetic moment (5) which is randomly oriented and which produce, on average, a negligible macroscopic magnetic field. FIG. 2, therefore shows the coating in an unpolarised state. As shown, when the coating is excited with a laser THz emission is produced.

Upon exposure to an external magnetic field, the magnetic moments (5) of each of the magnetic contaminant particles (4) are aligned, as depicted in FIG. 3, which shows the coating in a polarised state. Thus, the THz emission is enhanced (see FIG. 3) when compared to the original sample (see FIG. 2).

A particular feature of the ink of the present invention is the possibility to permanently write this change in the ink. That is, even after removing the external magnetic field, the emission from the ink maintains different properties to the original spectra (see FIG. 4).

Furthermore, another feature of the ink is that the direction of the magnetisation can be changed again using a subsequently applied external magnetic field, and can hence produce an effect equivalent to the unpolarised state. This allows for the change in THz emission previously written in the ink to be removed.

Yet another feature of the ink is that the coercive magnetic field and the net magnetic polarisation depend on the temperature. Hence, both the writing process and the terahertz emission in the polarised state in a certain ink region can be enhanced or inhibited by changing the temperature in that specific region.

The magnetic contaminant particles can be ferromagnetic or ferrimagnetic. For example, the magnetic contaminant particles can be particles of a hard ferromagnetic material, a hard ferrimagnetic material, a soft ferromagnetic material, or a soft ferrimagnetic material. Preferably, the magnetic material is a soft (low coercive field) material. More preferably, the magnetic material is a soft ferrimagnet. In some embodiments, the magnetic material comprises ferrite, and/or magnetite.

A skilled person would understand that the net magnetic polarisation depends on the temperature. A skilled person would also understand that the coercive field in some magnetic materials can be lowered by increasing the temperature and that this heating can be provided by the optical excitation absorbed by the ink. Hence, alternatively, the magnetic contaminant particles can be hard magnetic material with a low Curie temperature, such as less than 400 degrees K. For example, the magnetic contaminant particles may comprise (or be) chromium oxide.

Contaminant particles of the same semiconductor material as the primary material may be included, but wherein the particles have a different size and/or morphology than the particles of the primary material. As a result, although the coated surface comprises particles of the same semiconductor material (such that the surface would have a similar chemical composition and optical properties throughout), the spectrum of the generated THz radiation can be selectively controlled by selection of different particle sizes and/or morphologies.

As discussed above, the contaminant particles can be the same as the semiconductor particles but have a different size distribution, preferably wherein the contaminant particles are smaller. However, it is preferred that the contaminant particles are different from the semiconductors particles. That is, it is preferred for the material of the contaminant particles to differ from the material of the semiconductor particles.

Contaminant particles of one or more different semiconductor materials than that of the primary material may be included. In this case, the contaminant particles may have the same size and/or morphology as the main particle, or a different size and/or morphology.

Other suitable contaminant particles include particles of a non-magnetic material which is not a semiconductor material, for example, metal nanoparticles and/or nanoshells. Examples of suitable metals include gold, silver, aluminium, and any other metal which is conductive at THz frequencies. The metal nanoparticles and/or nanoshells may selectively absorb or reflect part of the spectrum of the laser excitation and hence tailor the emission. The contaminant particles may be composite particles comprising shells of gold, silver or aluminium on dielectric materials.

Other suitable contaminant particles are those which comprise a THz absorptive material which is known to absorb specific parts of the THz range. This results in a reduction in the intensity of radiation at those parts in the THz spectrum. This is shown in FIG. 5, where the coating on the substrate (2) comprises semiconductor particles (3) and THz absorbing contaminant particles (6). Examples of THz absorbing contaminant particles include organic materials exhibiting absorption resonance at THz frequencies, for example, ibuprofen, paracetamol and any other material exhibiting a strong absorption fingerprint within the THz band.

Contaminant particles may also be particles of compounds exhibiting an absorption depth below about 10 μm within the frequency range of between 0.1 THz and 10 THz.

FIG. 6 shows a conceptual depiction of the THz emission spectra from a coated substrate analogous to the one shown in FIG. 5 to illustrate the principle of encoding features in the THz spectrum via THz absorptive materials.

The contaminant particles may comprise two or more different types of contaminant particles.

If present, the contaminant particles are preferably present in the ink in the amount of less than about 70 wt. %, based on the total weight of the ink. In some embodiments, the contaminant particles are present in the ink in the amount of less than about 50 wt. %, less than about 30 wt. %, less than about 10 wt. %, less than about 5 wt. %, or less than about 1 wt. %. In each case, if present the amount of contaminant particles is greater than 0 wt. %. The amount of contaminant particles is dictated by the specific alteration of the terahertz spectrum sought. In some embodiments, there are substantially no contaminant particles present. In some embodiments, there are no contaminant particles present.

Deposition Process

The ink can be deposited on the substrate by any conventional means of deposition, for example via ink-jet printing, lithographic printing, gravure printing, flexographic printing, aerosol spraying, brushing, or ballpoint pen marking.

The ink can be deposited on a substrate without the requirement for specific post-processes, other than drying or otherwise passively removing the carrier. Drying may comprise the evaporation or removal of the carrier.

However, the ink can be deposited on a substrate and subjected to a simple post-process. For example, a second substance may be deposited on top of the deposited ink. The second substance may be a film or a laminate. For example, the second substance may comprise a lacquer, a varnish, a thermoplastic solution paint, or a plastic laminate. The second substance may comprise a chemical composition which reacts or interacts with the carrier of the ink to facilitate or speed-up removal of the carrier from the substrate.

Drying

The method of the invention involves the step of allowing the ink to form a coating. This step may comprise drying the ink (see FIG. 7).

Thus, step (b) of the method of the invention may comprise:

(b) drying the ink to form a coating.

This drying step may be active or passive.

For example, the drying may be passive, such that the ink is left to dry under atmospheric conditions.

Alternatively, the drying step may be active. For example, the ink may be deposited on a heated substrate. The ink may be deposited on a heated substrate so as to minimise the formation of so-called coffee-ring effects (non-uniform drying of the ink and formation of patterns).

Preferably, step (b) is carried out in the presence of air. That is, there is direct contact between air and the ink during step (b).

Additionally or alternatively, the ink may be otherwise heated to help dry the ink. For example, the ink may be deposited on a substrate to form a coating, after which heat is applied. For example, heated gas (preferably air) may be used to help dry the ink.

Alternatively, the coating may be subject to a flow of (non-heated) gas (preferably air) to help dry the ink.

The time and temperature needed to dry the ink will vary depending on the chemical and physical properties of the ink, and the skilled person would be capable of selecting suitable drying conditions.

By way of example, the ink may be deposited onto a heated substrate and may dry in a few seconds. This may be with minimal or no gas flow. At higher temperatures, the drying time can be reduced. Alternatively, at a higher gas flow, the drying time can be reduced.

The skilled person would be well aware of other methods or techniques for actively drying the ink.

After drying the ink forms a coating (i.e. a dried ink). This coating may comprise a binder if one was present in the original ink.

Pump Laser

The coated surface that is produced after the ink has dried generates a THz pulse in response to the excitation with an ultrafast laser pulse of an appropriate wavelength. This is shown in FIG. 8, which shows THz emission from a substrate coated by dried ink, where (1) is a binder, (2) is the substrate, and (3) are the semiconductor particles. The ultrafast laser pulse can have a pulse width from about 100 fs to about 1 ps. The ultrafast laser pulse may have a wavelength within the range from about 400 nanometers to about 1600 nanometers.

The optical polarisation of the laser may be p-polarised, i.e. polarised in the plane of incidence, which is the plane containing the laser impinging ray and the laser reflected ray. The emission of THz radiation may be increased when using a p-polarised laser.

The polarisation of the generated THz wave may be mostly p-polarised. A magnetic field can be used to alter the preferential direction of polarisation. A wide range of angles of incidences is suitable. The maximum emission may be achieved in proximity to 45 degrees of angle of incidence (with respect to the surface normal). However, there may be a significant dependence of this condition (the angle of incidence corresponding to a maximum of the emission) on the particle morphology and the presence of external or impressed (via magnetic contaminants) magnetic fields.

The ultrafast laser pump can preferably be any 100 fs-200 fs pulsed with MHz repetition rate within the range 400 nm-1600 nm. Possible examples are, but not limited to, mode-locked lasers based on Ti:Sa, Ytterbium, Erbium amplifying media, either free-space or fibred, and optical parametric oscillators. The powers available from commercial devices exceed the requirements for obtaining relevant emissions (tens to hundreds of mW).

As explained above, in some embodiments it may be desirable to selectively change the temperature (preferably by heating) at least of a portion of the coating to a desired temperature, e.g. so as to enable a specific temperature-dependent THz emission from the selectively heated portions. As will be understood, the pump laser may be used to additional selectively heat at least a portion of the coating to a desired temperature. For instance, a distribution of the pump intensity (or other properties) of the laser on the coating surface may be selected so as to both selectively heat the coating and generate THz radiation from the coating with a specific spatial distribution.

Alternatively to, or in addition to, the pump laser, another laser may be used to selectively heat or cool at least a portion of the coating to a desired temperature. As will be understood, any number of different means, in isolation or in combination, may be used to selectively heat or cool at least a portion of the coating to a desired temperature (for instance, by including contaminant particles which, in combination with the pump laser, act as heat sources or heat sinks).

Emission Mechanism

Without wishing to be bound by theory, it is believed that the laser pulse photo-excites pairs of electrons and holes within the semiconductor particles. The photo-excitation takes place in the proximity of the interface between the semiconductor particle and the surrounding medium, i.e. within a region extending between the interface and an optical penetration depth relative to the interface. THz radiation can then be generated from a surface-emission effect.

Any surface-emission mechanism capable of generating THz radiation can be utilised, and the person skilled in the art would be well aware of such mechanisms. Examples include the photo-Dember effect, surge current emission and surface optical rectification.

By way of example, the photo-Dember effect is a THz generation mechanism which occurs when a material exhibits a significant difference in mobility between electrons and holes. An ultrashort optical pulse is absorbed by a very high-absorptive semiconductor. This generates a dense distribution of electron-hole pairs within the optical absorption depth (in low-bandgap III-V semiconductor this can be from about 100 nm to about 200 nm).

The proximity with the surface forces a diffusion dynamics towards the bulk (as shown in FIG. 9), which can be modelled in terms of current obeying the Fick's Law, $$J = -D_q \nabla \rho_q.$$

Here, J is the current transient density arising from a concentration density of carriers $\rho_q$ with associated diffusion constant $D_q$. In narrow bandgap semiconductors, such as InAs, the direct and narrow bandgap guarantees very high absorption at near-IR wavelengths, with a ratio of the electron to hole mobility about $\mu_e/\mu_h \sim 10^2$. The carrier mobility is proportional to the diffusion constant via the Wright-Sullivan relation for charged particles, $$D_q = \frac{\mu_q K_B T}{q},$$

where $k_B$ is the Boltzmann constant, T is the absolute temperature, and q is the charge of the particle. Thus, electrons diffuse into the bulk approximately 100 times faster than holes, which stay comparatively static. The charge imbalance results in an electrical dipole as pictured in FIG. 9.

In particular, the symmetry of the diffusion is broken by the interface where the optical beam is absorbed, whereas the diffusion coefficients are marginally affected by the crystallographic orientation. This means that in a random distribution of particles on a surface, the terahertz generated by the photo-Dember effect is fundamentally emitted with a similar phase from each particle.

Moreover, as will be understood, the photo-Dember effect in a particle may also depend on the temperature.

Surge-current emission (also known as surface field emission and drift-diffusion emission) is another mechanism which can result in the generation of THz radiation from a semiconductor surface. Surge current emission requires the presence of a surface electric field. Here, upon irradiation of the surface by an ultrashort laser pulse, photo-exited electrons and holes are accelerated in opposite directions due to the surface electric field.

As a result, a surge current perpendicular to the semiconductor surface is generated, as pictured in FIG. 10. This surge current (or transient current) consequently gives rise to THz radiation. Any semiconductor exhibiting significant surface fields and excited with ultrafast pulses at a high-absorbed wavelength express this generation mechanism (for example gallium arsenide [GaAs] and indium phosphide [InP]). In materials with strong mobility unbalance (like InAs and InSb), the contribution of the surge emission is considered of minor importance.

In addition to the mechanisms mentioned above, surface optical rectification may contribute to the generation of THz radiation. In surface optical rectification, the incident optical field interacts with the surface electric field via a third-order nonlinear optical process. The interaction takes place within the penetration depth of the optical field. The properties of the emitted THz radiation depend on the crystallographic orientation of the particle and could also depend on the polarisation of the incident field. The THz generated by surface optical rectification is not the result of a carrier diffusion process. Compared to surge emission and photo-Dember, this mechanism does not rely on the dynamics of carriers, hence it does not require absorption. Conversely, it is only driven by the nonlinear response of the material that converts photons from the optical pump into terahertz photons. This mechanism is governed by the surface field as it is responsible for the surface quadratic response. In material with large mobility unbalance, like InAs and InSb, its contribution is relevant only at very large optical pulse fluences (above $\mu J/cm^2$).

Writing and Erasing THz Emission

As discussed above, the ink used in the present invention may comprise contaminant particles, such as magnetic particles.

In this case, as discussed above, a magnetic field may be used to alter the THz emission of the ink, thereby effectively "writing" the THz emission.

Thus, in one aspect the invention provides an ink comprising a carrier, particles of a semiconductor and particles of a magnetic material. The particles of magnetic material may absorb THz radiation.

Following the method of the invention will result in a coating that will generate terahertz radiation when exposed to a laser. The terahertz radiation will have a certain distribution (i.e. a certain specific THz emission spectrum will be seen), i.e. the first or initial distribution of terahertz radiation. As would be well understood by the skilled person, the distribution of THz may be measured in terms of frequency vs. signal strength. This may be presented visually in the format shown in FIG. 6. It will be understood that a different distribution may comprise a different distribution in terms of frequency content and/or different amplitude of the signal. Thus, a different distribution effectively means a different THz spectrum.

Subsequently, when the ink (and therefore the dried ink or coating) comprises magnetic particles, the method of the invention may further comprise generating a second distribution of terahertz radiation different to the first distribution of terahertz radiation by exposing the dried ink or coating to a first magnetic field. That is, the method may further comprise (d) exposing the coating to a first magnetic field; and (e) shining a laser onto the coating so as to generate terahertz radiation, wherein the terahertz radiation generated in step (e) has a different distribution to the terahertz radiation generated in step (c).

Preferably, the terahertz radiation generated in step (e) is stronger than the terahertz radiation generated in step (c).

The alteration in terahertz radiation may be temporary, that is it only occurs in the presence of a magnetic field. Preferably, however, the alteration in terahertz radiation is permanent, and will hence be retained when the magnetic field is removed. Thus, the magnetic field may be removed before shining the laser in step (e).

Alternatively, the step of exposing the ink to the first magnetic field may take place before step (c), such that the method comprises: exposing the coating to a first magnetic field after step (b) and removing the first magnetic field before shining the laser in step (c); or exposing the coating to a first magnetic field after step (b) and maintaining the first magnetic field during step (c).

As discussed above, a magnetic field can therefore be used to "write" the THz ink by altering the distribution of terahertz radiation. However, a magnetic field can also be used to "erase" the "writing".

Thus, the method may further comprise exposing the coating to a second magnetic field in place of the first magnetic field, preferably wherein the second magnetic field is perpendicular to the first magnetic field. In relation to the method discussed above, this may be step (f) or (d), depending on the method.

For example, the method may comprise:

(d) exposing the coating to a first magnetic field;

(e) shining a laser onto the coating so as to generate terahertz radiation, wherein the terahertz radiation generated in step (e) has a different distribution to the terahertz radiation generated in step (c);

(f) exposing the coating to a second magnetic field;

(g) shining a laser onto the coating so as to generate terahertz radiation, wherein the terahertz radiation generated in step (g) has a different distribution to the terahertz radiation generated in step (e).

The first magnetic field may be removed before step (e) (i.e. before shining the laser in step (e)) and/or the second magnetic field may be removed before step (g) (i.e. before shining the laser in step (g)).

Preferably, the terahertz radiation generated in step (g) has the same or a substantially similar distribution to the terahertz radiation generated in step (c). For example, the terahertz radiation generated in step (g) may be weaker than the terahertz radiation generated in step (e).

Preferably, the second magnetic field is perpendicular to the first magnetic field.

Uses

The present invention is unrelated to techniques that require growing materials on surfaces, as such techniques require complex deposition processes, strictly specified process environment and are typically not scalable and not applicable to arbitrary surfaces. As discussed above, although methods for generating THz radiation from particle-layer deposits on a surface are known in the art, these methods require that the substrate must be subject to complex deposition and post-deposition processes to form a coated surface capable of emitting THz radiation.

The present inventors have found that depositing an ink on a substrate, wherein the ink comprises particles of a semiconductor of the nature discussed above, allows the selective generation of THz radiation from a wide variety of different surfaces.

The present invention provides a novel type of terahertz sources and, as such, may be implemented in the vast plethora of uses for THz radiation.

As THz radiation is only visible to very specific and specialised equipment, the present invention can be used to embed invisible information on items (e.g. crypto watermarking).

The present invention can also be used to encode information into the spectrum of the THz radiation generated from a substrate, wherein the spectrum can be adjusted by varying the properties of the laser and/or by including contaminant particles into the ink.

The present invention can also be used to encode information into the spectrum of the THz radiation generated from a substrate, wherein the spectrum can be adjusted by varying the temperature of the ink.

The present invention can be used to write and erase a terahertz source of specific morphology by inducing magnetic polarisation in the ink. In addition, because the magnetisation depends on the temperature, the present invention can be used to create a terahertz source with a morphology that depends on the temperature. Similarly, the properties of the terahertz emitted from the source can also depend on the temperature (as discussed above, and below in reference to FIG. 18). That is, the THz spectra can change with temperature.

The present invention can be used to generate a spatial distribution of terahertz radiation, in which the terahertz emission is different in different points of the coating. This can be the result of different types of ink in different parts of the coating, different temperatures in different parts of the coating, different states of magnetisation in different parts of the coating, or a combination thereof.

Furthermore, the present invention may be used as a source of THz radiation embedded in other devices or applications.

The present invention may also be used as a source of THz radiation for flexible electronics (wearable technologies). The present invention may also be used as a source of THz radiation in CMOS-based integrated photonic devices.

The present invention enables the emission from an arbitrary point on an extensive or relatively large surface. It could be used to embed terahertz diagnostics in other applications (for example, an item could transmit a signal revealing signs of degradation).

For example, the protective surface of a pharmaceutical capsule could be functionalised to perform the spectroscopy of the active compound inside it to assess its state of degradation.

It is understood that any and all features of the present invention may be taken in conjunction with any other feature or features to describe additional embodiments of the invention.

EXAMPLES

FIG. 11 illustrates the experimental setup used for the simultaneous excitation and characterisation of the ink (a complete description of the setup can be found in Peters et al., Nano Energy 46, 128 (2018)). The experimental setup comprises an Optical Parameter Oscillator emitting fs-pulses in the wavelength range 1000-1600 nm. The laser impinges on the ink sample and generates THz radiation. The generated THz radiation is collected by a pair of parabolic mirrors and detected through a THz ultrafast detector based on Electro-Optical sampling. The electro-optic detection allows retrieving the time-resolved oscillations of the THz electric field for different values of the mutual delay between pump and probe pulses (inset).

As illustrative examples of the invention, different versions of the proposed ink were fabricated, each comprising InAs particles with different sizes initially immersed in water (see Table 1).

TABLE 1

| Ink | Average hydrodynamic diameter of InAs particles (nm) | RT (g · min) |
|---|---|---|
| 1 | 350 ± 20 | 10000 |
| 2 | 500 ± 10 | 4000 |
| 3 | 550 ± 40 | 950 |
| 4 | 940 ± 100 | 250 |
| 5 | 960 ± 120 | 60 |
| 6 | 950 ± 60 | 20 |

The inks were deposited on glass, ceramic and semiconductor substrates via airbrush deposition and the samples were left to air-dry.

A microscopy image of the ink of Example 5 after deposition on a substrate is shown in FIG. 12. As clear from FIG. 12, the ink is completely black at visible wavelengths.

FIG. 13 shows the electric field traces of the THz emission from Inks 3, 4 and 6.

These results were obtained by considering pump pulses with a central frequency of $\lambda_{pump}$=1200 nm, and the corresponding spectrum is shown in FIG. 14.

FIG. 15 shows the emission spectrum of Ink 6 for three different pumping wavelengths ($\lambda_{pump}$=100, 1200 and 1600 nm, respectively) and demonstrates the dependence of the THz emission on the optical pumping parameters.

To exemplify the dependence on the morphological features of the ink, FIG. 16 illustrates the THz field traces as a function of the pump wavelength for some of the inks. As evinced by FIG. 16, the characteristic particle size introduces both a variation of the spectral properties of the THz emission, as well as a cut-off in the pumping wavelengths. Specifically, smaller particle components become irresponsive (i.e. non-emitting) to pumping pulses with larger wavelengths.

FIG. 17 shows the experimental proof of the principle of writing and erasing an ink comprising magnetic contaminants (magnetite), and of the magnetic enhancement of the THz emission. When a magnetic field is applied parallel to the ink film (step 1), a pump illumination results in the emission of an amplitude-enhanced THz pulse. When the field is removed (step 2), the emission exhibits a memory effect, i.e. part of the enhancement is retained. When an erasing magnetic field is applied perpendicularly (step 3) the enhancement is permanently erased, hence once removed the emission remains in the weaker state (step 4).

FIG. 18 shows the waveform emitted from ink at different temperatures. In this example, a region of an ink coating was heated and the emitted terahertz radiation upon the same-laser illumination was detected. As is shown by FIG. 18, the emitted waveform was significantly altered by the local temperature change.

Embodiments

Some preferred embodiments of the invention include:

Embodiment 1. A method of generating terahertz radiation which comprises:

(a) depositing an ink on a substrate, wherein the ink comprises particles of a semiconductor;

(b) allowing the ink to form a coating;

(c) shining a laser onto the coating so as to generate terahertz radiation.

Embodiment 2. The method of Embodiment 1, wherein the semiconductor has a bandgap energy from about 2 to about 5 times lower than the excitation wavelength; and/or wherein the semiconductor material has a bandgap in the range from about 0.18 eV to about 0.5 eV.

Embodiment 3. The method of Embodiment 1 or 2, wherein the semiconductor is a III-V semiconductor material.

Embodiment 4. The method of any preceding Embodiment, wherein the semiconductor is selected from the group consisting of gallium nitride, indium nitride, indium gallium nitride, gallium phosphide, indium arsenide, gallium arsenide, aluminium gallium arsenide, indium phosphide, indium antimonide, gallium antimonide, and combinations thereof.

Embodiment 5. The method of any preceding Embodiment, wherein the semiconductor is selected from the group consisting of indium arsenide, gallium arsenide, indium phosphide, indium antimonide, and combinations thereof.

Embodiment 6. The method of any preceding Embodiment, wherein the semiconductor is selected from the group consisting of indium arsenide, indium antimonide, and combinations thereof.

Embodiment 7. The method of any preceding Embodiment, wherein the semiconductor is n-doped.

Embodiment 8. The method of any of Embodiments 1-6, wherein the semiconductor is p-doped.

Embodiment 8. The method of any preceding Embodiment, wherein at least some, preferably at least about 50 wt. %, of the semiconductor particles have a hydrodynamic diameter within the range from about 500 nm to about 2000 nm.

Embodiment 9. The method of any preceding Embodiment, wherein at least some, preferably at least about 50 wt. %, of the semiconductor particles have a hydrodynamic diameter within the range from 750 nm to about 1500 nm.

Embodiment 10. The method of any preceding Embodiment, wherein at least some, preferably at least about 50 wt. %, of the semiconductor particles have a hydrodynamic diameter within the range from about 1000 nm to about 1200 nm.

Embodiment 11. The method of any preceding Embodiment, wherein all of the semiconductor particles have a hydrodynamic diameter within the range from about 500 nm to about 2000 nm.

Embodiment 12. The method of any preceding Embodiment, wherein all of the semiconductor particles have a hydrodynamic diameter within the range from 750 nm to about 1500 nm.

Embodiment 13. The method of any preceding Embodiment, wherein all of the semiconductor particles have a hydrodynamic diameter within the range from about 1000 nm to about 1200 nm.

Embodiment 14. The method of any preceding Embodiment, wherein the semiconductor particles have an aspect ratio greater than 1.

Embodiment 15. The method of any preceding Embodiment, wherein the semiconductor particles have an aspect ratio from about 5 to about 100.

Embodiment 16. The method of any preceding Embodiment, wherein the semiconductor particles have a length of from about 500 nm to about 1000 nm and a thickness of from about 50 nm to about 250 nm.

Embodiment 17. The method of any preceding Embodiment, wherein the ink comprises a carrier selected from water and an organic solvent.

Embodiment 18. The method of Embodiment 17, wherein the organic solvent is cyclohexane or isopropanol.

Embodiment 19. The method of any preceding Embodiment, wherein the ink further comprises a binder.

Embodiment 20. The method of Embodiment 19, wherein the binder is selected from the group consisting of polyvinylalcohol, polyvinylpyrrolidone, cellulose derivatives, polystyrene, cellulose acetate, thermoplastic and thermoset polymers, and combinations thereof.

Embodiment 21. The method of any preceding Embodiment, wherein the method comprises exposing the coating to a magnetic field after step (b).

Embodiment 22. The method of Embodiment 21, wherein the method comprises removing the magnetic field before shining a laser onto the coating.

Embodiment 23. The method of any preceding Embodiment, wherein the substrate comprises a metal, a plastic, a cellulose-based product, glass, a ceramic, carbon fibre, or a combination thereof.

Embodiment 24. The method of Embodiment 23, wherein the cellulose-based product is paper, paperboard or cardboard.

Embodiment 25. The method of any preceding Embodiment, wherein, in step (c), at least a part of the coating is at a first temperature and wherein the generated terahertz radiation comprises a first distribution of terahertz radiation, the method further comprising step (d) heating or cooling (preferably heating) said at least a part of the coating to a second temperature different than the first temperature, and step (e) generating a second distribution of terahertz radiation different to the first distribution of terahertz radiation.

Embodiment 26. The method of any preceding Embodiment, wherein the ink further comprises contaminant particles.

Embodiment 27. The method of Embodiment 26, wherein the contaminant particles comprise magnetic contaminant particles, preferably wherein said magnetic contaminant are particles of a soft ferrimagnetic material.

Embodiment 28. The method of Embodiment 27, wherein the generated terahertz radiation in step (c) comprises a first distribution of terahertz radiation, the method further comprising generating a second distribution of terahertz radiation different to, and preferably stronger than, the first distribution of terahertz radiation by exposing the coating to a first magnetic field.

Embodiment 29. The method of Embodiment 28, wherein the step of exposing the coating to the first magnetic field comprises: exposing the coating to the first magnetic field after step (b) and removing the first magnetic field before shining a laser onto the coating; or exposing the coating to the first magnetic field after step (b) and maintaining the first magnetic field during step (c).

Embodiment 30. The method of Embodiment 28 or 29, wherein the method further comprises generating a third distribution of terahertz radiation, different to and in place of the second distribution of terahertz radiation, by exposing the coating to a second magnetic field in place of the first magnetic field, preferably wherein the second magnetic field is perpendicular to the first magnetic field.

Embodiment 31. The method of Embodiment 30, wherein the third distribution of terahertz radiation comprises reduced THz radiation compared to the second distribution of terahertz, such as substantially no THz radiation.

Embodiment 32. The method of any of Embodiments 25-31, wherein the first distribution of terahertz radiation comprises substantially reduced THz radiation or substantially no THz radiation.

Embodiment 33. The method of any preceding Embodiment, wherein the ink further comprises contaminant particles which absorb THz radiation.

Embodiment 34. The method of Embodiment 33, wherein the contaminant particles comprise a particles of a different semiconductor.

Embodiment 35. The method of Embodiment 33, wherein the contaminant particles comprise ibuprofen or paracetamol.

Embodiment 36. The method of Embodiment 33, wherein the contaminant particles comprise composite particles comprising shells of gold, silver or aluminium on dielectric materials Embodiment 37. The method of Embodiment 33, wherein the contaminant particles comprise particles of compounds exhibiting absorption depth below about 10 μm within 0.1 THz and 10 THz.

Embodiment 38. The method of any of Embodiments 26-37, wherein the contaminant particles are present in the ink in the amount of greater than 0 wt. % and less than about 70 wt. %, based on the total weight of the ink.

Embodiment 39. An ink comprising a carrier, particles of a semiconductor, and contaminant particles which absorb THz radiation.

Embodiment 40. The ink of Embodiment 39, wherein the contaminant particles comprise particles of a magnetic material.

Embodiment 41. The ink of Embodiment 39, wherein the contaminant particles comprise a particles of a different semiconductor.

Embodiment 42. The ink of Embodiment 39, wherein the contaminant particles comprise ibuprofen or paracetamol.

Embodiment 43. The ink of Embodiment 39, wherein the contaminant particles comprise composite particles comprising shells of gold, silver or aluminium on dielectric materials Embodiment 44. The ink of Embodiment 39, wherein the contaminant particles comprise particles of compounds exhibiting absorption depth below about 10 μm within 0.1 THz and 10 THz.

The invention claimed is:

1. A method of generating terahertz radiation which comprises:
   (a) depositing an ink on a substrate, wherein the ink comprises particles of a semiconductor;
   (b) allowing the ink to form a coating;
   (c) shining a laser onto the coating so as to generate terahertz radiation.

2. The method of claim 1, wherein the semiconductor has a bandgap energy from about 2 to about 5 times lower than the excitation wavelength; and/or wherein the semiconductor material has a bandgap in the range from about 0.18 eV to about 0.5 eV.

3. The method of claim 1, wherein the semiconductor is a III-V semiconductor material.

4. The method of claim 1, wherein the semiconductor is n-doped or p-doped.

5. The method of claim 1, wherein at least about 50 wt. %, of the semiconductor particles have a hydrodynamic diameter within the range from about 500 nm to about 2000 nm.

6. The method of claim 1, wherein the semiconductor particles have an aspect ratio greater than 1.

7. The method of claim 1, wherein the ink comprises a carrier selected from water and an organic solvent.

8. The method of claim 1, wherein the ink further comprises a binder.

9. The method of claim 1, wherein, in step (c), at least a part of the coating is at a first temperature, the method further comprising heating or cooling said at least a part of the coating to a second temperature different than the first temperature.

10. The method of claim 9, wherein the generated terahertz radiation in step (c) comprises a first distribution of terahertz radiation, the method comprising generating a second distribution of terahertz radiation different to the first distribution of terahertz radiation by heating or cooling said at least a part of the coating to a second temperature different than the first temperature.

11. The method of claim 1, wherein the method comprises exposing the coating to a magnetic field after step (b).

12. The method of claim 11, wherein the method comprises removing the magnetic field before shining a laser onto the coating.

13. The method of claim 1, wherein the substrate comprises a metal, a plastic, a cellulose-based product, glass, a ceramic, carbon fibre, or a combination thereof.

14. The method of claim 1, wherein the ink further comprises magnetic contaminant particles.

15. The method of claim 14, wherein the generated terahertz radiation in step (c) comprises a first distribution of terahertz radiation, the method further comprising generating a second distribution of terahertz radiation different to the first distribution of terahertz radiation by exposing the coating to a first magnetic field.

16. The method of claim 15, wherein the step of exposing the coating to the first magnetic field comprises: exposing the coating to the first magnetic field after step (b) and removing the first magnetic field before shining a laser onto the coating; or exposing the coating to the first magnetic field after step (b) and maintaining the first magnetic field during step (c).

17. The method of claim 14, wherein the method further comprises generating a third distribution of terahertz radiation, different to and in place of the second distribution of terahertz radiation, by exposing the coating to a second magnetic field in place of the first magnetic field, preferably wherein the second magnetic field is perpendicular to the first magnetic field.

18. The method of claim 1, wherein the ink further comprises contaminant particles wherein the material of the contaminant particles is different from the semiconductor, wherein the contaminant particles absorb THz radiation and/or are configured to change the temperature of the particles of the semiconductor when exposed to radiation.

* * * * *